(12) United States Patent
Harrison et al.

(10) Patent No.: US 6,206,350 B1
(45) Date of Patent: Mar. 27, 2001

(54) FILM FILL-PACK FOR INDUCEMENT OF SPIRALING GAS FLOW IN HEAT AND MASS TRANSFER CONTACT APPARATUS WITH SELF SPACING FILL-SHEETS

(75) Inventors: Richard H. Harrison, Columbus; Thomas P. Carter, Olney; Sarah L. Ferrari, Millersville; Bryan F. Garrish, Ellicott City, all of MD (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 0 days.

(21) Appl. No.: 09/200,546

(22) Filed: Nov. 25, 1998

(51) Int. Cl.[7] .................................................. B01F 3/04
(52) U.S. Cl. .............................. 261/112.2; 261/DIG. 11; 261/DIG. 72; 96/356
(58) Field of Search ........................ 261/112.1, 112.2, 261/DIG. 11, DIG. 72; 96/356

(56) References Cited

U.S. PATENT DOCUMENTS

| | | |
|---|---|---|
| 389,624 | 9/1888 | Wilson . |
| 2,640,194 | 5/1953 | Hytte ................................ 257/256 |
| 2,793,017 | 5/1957 | Lake ................................. 261/112 |
| 2,977,103 | 3/1961 | Smith et al. ...................... 261/111 |
| 3,084,918 | 4/1963 | Kohl et al. ....................... 261/112 |
| 3,249,155 | 5/1966 | Huet ................................. 165/166 |
| 3,262,682 | 7/1966 | Bredberg ............................ 261/29 |
| 3,286,999 | 11/1966 | Takeda ............................... 261/30 |
| 3,365,885 * | 1/1968 | Meek .......................... 261/DIG. 11 |
| 3,374,992 | 3/1968 | Greer ................................ 261/112 |
| 3,395,903 | 8/1968 | Norback ........................... 261/112 |
| 3,500,615 | 3/1970 | Meek ................................... 55/233 |
| 3,540,702 | 11/1970 | Uyama ............................. 261/112 |
| 3,599,943 | 8/1971 | Munters ............................. 261/95 |
| 3,612,494 | 10/1971 | Toyama ........................... 261/112 |
| 3,618,778 | 11/1971 | Benton et al. .................... 210/150 |
| 3,726,408 | 4/1973 | Gewiss ............................. 210/493 |

(List continued on next page.)

FOREIGN PATENT DOCUMENTS

| | | |
|---|---|---|
| 684870 | 12/1939 | (DE) . |
| 1939796 | 5/1970 | (DE) . |
| 2810094 | 10/1978 | (DE) . |
| 0056911 | 3/1981 | (EP) . |
| 1428875 | 1/1966 | (FR) . |
| 1489126 | 6/1967 | (FR) . |
| 450524 | 10/1934 | (GB) . |
| 792740 | 4/1958 | (GB) . |
| 962432 | 7/1964 | (GB) . |
| 1221073 | 2/1971 | (GB) . |

OTHER PUBLICATIONS

Brochure: "Coolflo Plastic Packing for Water Cooling Towers"; Serck Visco, Stafford Road, Croydon, CR9 4DT; No Date.

*Primary Examiner*—David A. Simmons
*Assistant Examiner*—Robert A. Hopkins
(74) *Attorney, Agent, or Firm*—Edward J. Brosius; Stephen J. Manich

(57) ABSTRACT

A film fill-pack has a plurality of fill-sheets with an ordered array of ridges and grooves generally extending above a planar surface on both the obverse and reverse surfaces of a fill-sheet, which fill-sheets at an assembled state provide the ridges and grooves of facing obverse and reverse surfaces of adjacent fill-sheets in an arrangement providing a plurality of channels between adjacent fill-sheets for gas flow therethrough and where the ordered arrangement of ridges and grooves induces spiraling of the gas flow through the channels for promotion of improved heat transfer; and, where the fill-sheets further include a spacing arrangement providing a compact nesting of adjacent sheets with minimal sheet-to-sheet displacement at least at two of the edges for compact handling, transfer and storage with a self-spacing of adjacent fill-sheets at assembly of the film fill-pack.

39 Claims, 14 Drawing Sheets

U.S. PATENT DOCUMENTS

| | | |
|---|---|---|
| 3,733,063 | 5/1973 | Loetel et al. .......................... 261/112 |
| 3,963,810 | 6/1976 | Holmberg et al. ................... 261/112 |
| 3,965,225 | 6/1976 | Schinner ............................. 261/79 A |
| 4,269,796 | 5/1981 | Glicksman et al. ................. 261/112 |
| 4,296,050 * | 10/1981 | Meier ................................ 261/112.2 |
| 4,361,426 | 11/1982 | Carter et al. ..................... 55/257 PV |
| 4,518,544 | 5/1985 | Carter et al. .......................... 261/112 |
| 4,548,766 | 10/1985 | Kinney, Jr. et al. ................. 261/112 |
| 4,657,711 * | 4/1987 | Wigley .............................. 261/112.2 |
| 4,801,410 | 1/1989 | Kinney, Jr. et al. .............. 261/112.2 |
| 5,312,464 * | 5/1994 | Gay ................................... 261/112.2 |
| 5,722,258 | 3/1998 | Aitken ................................... 62/643 |

* cited by examiner

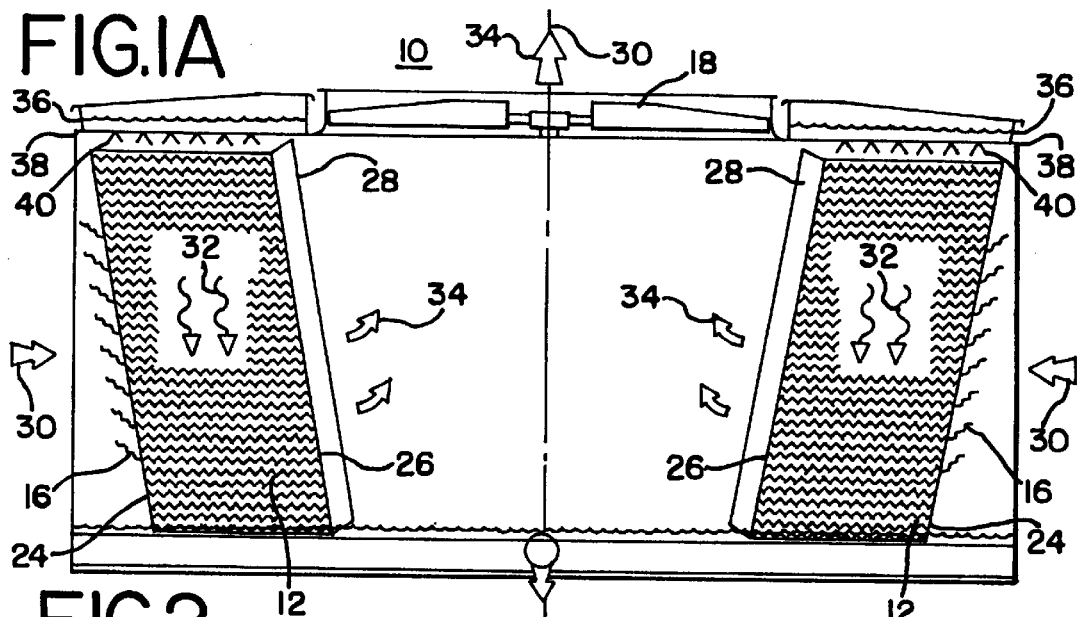
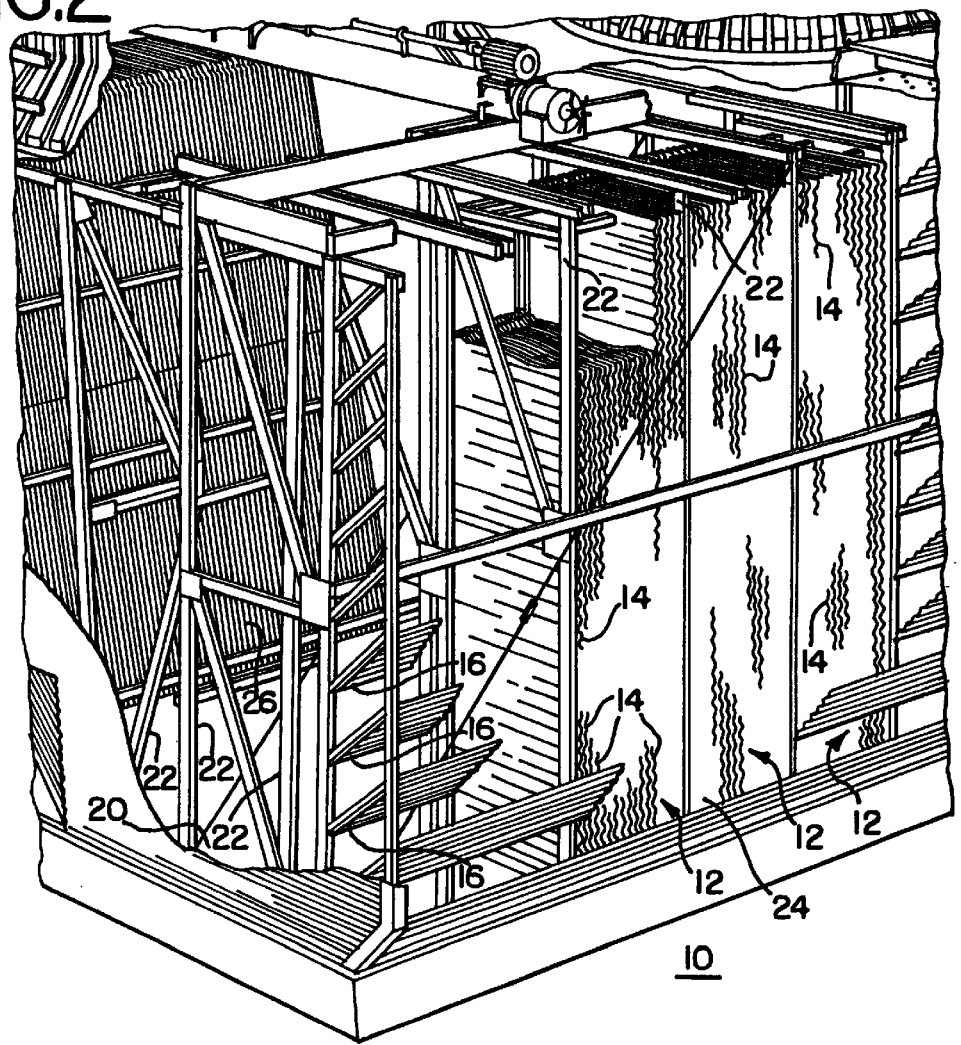

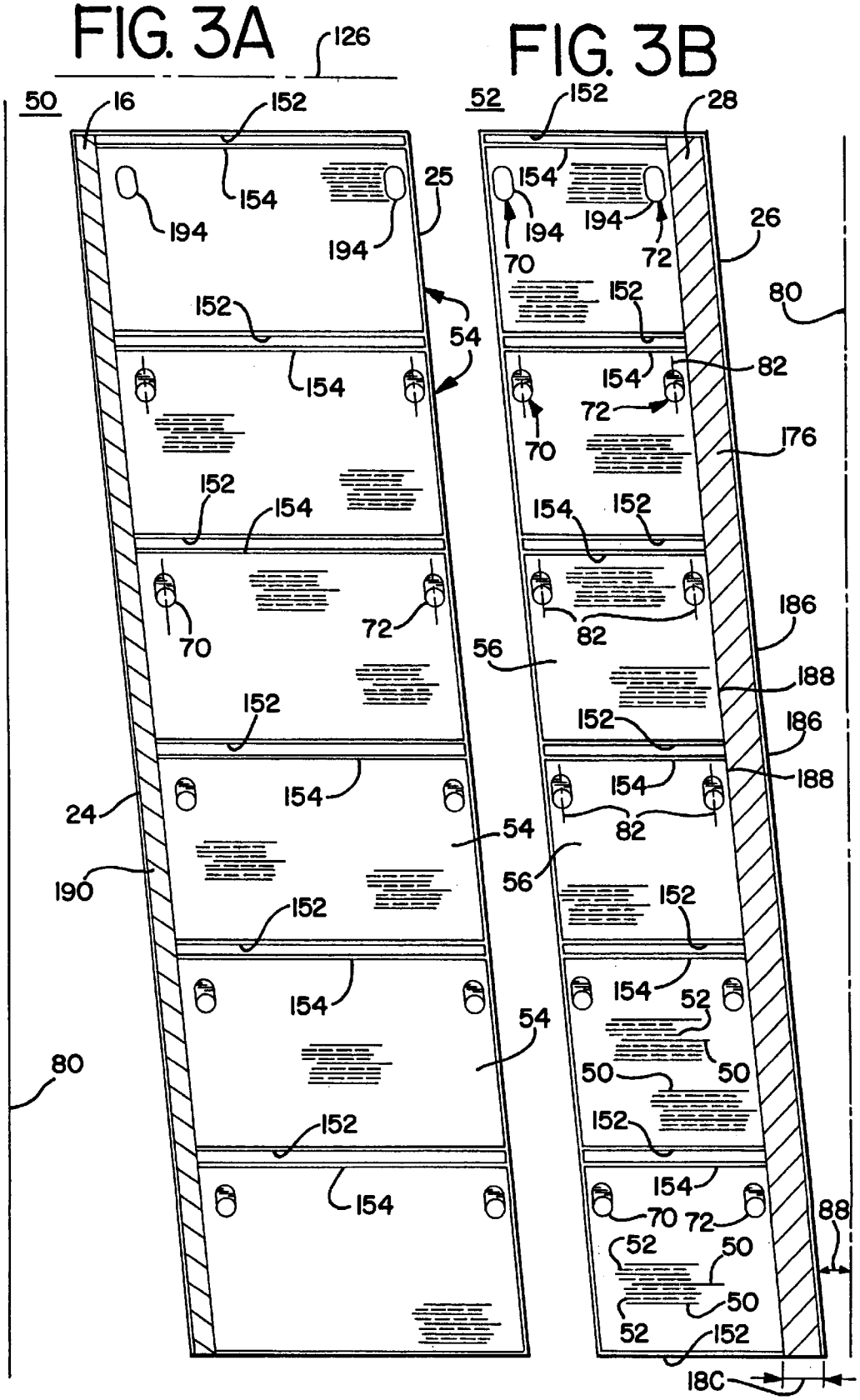

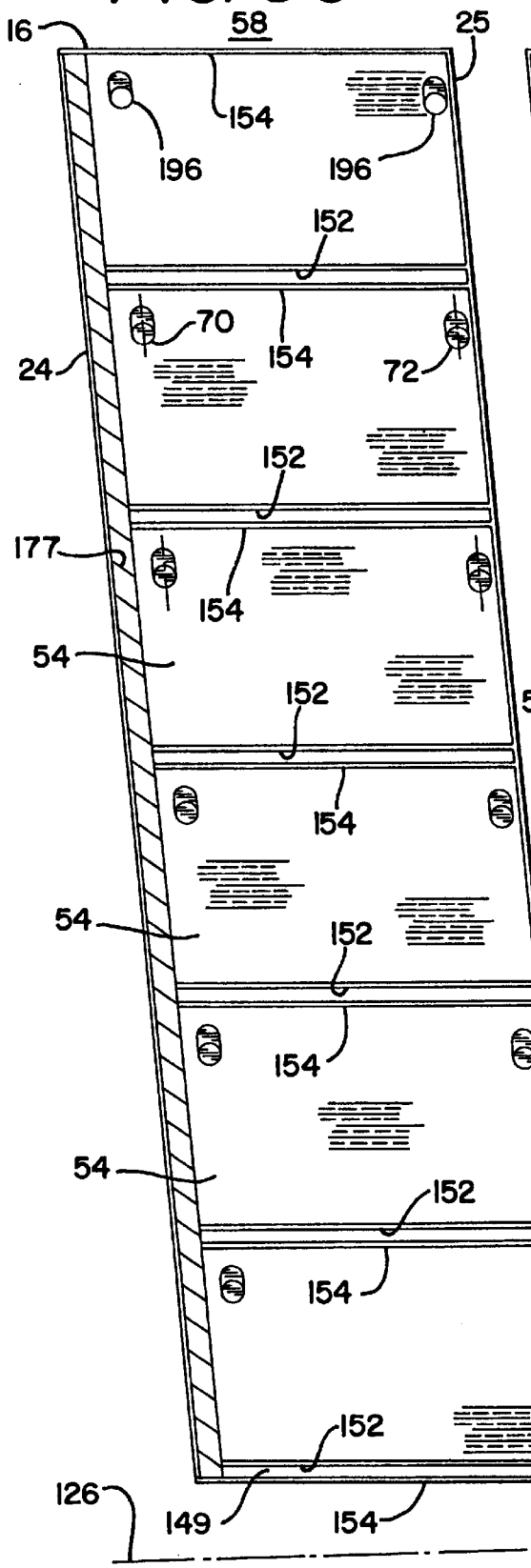
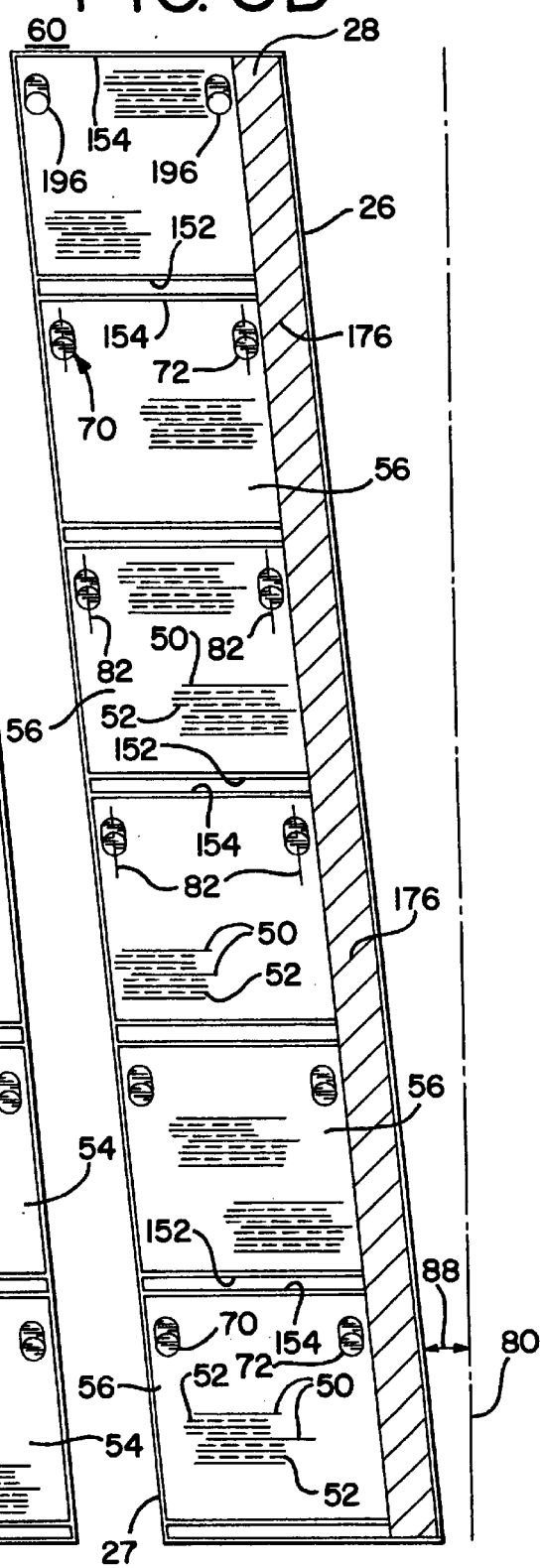

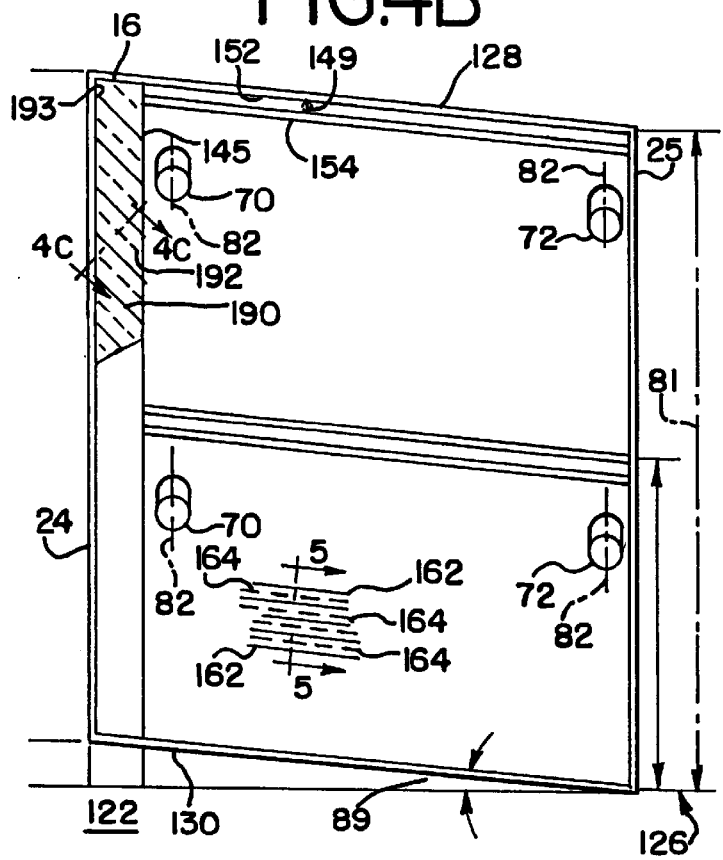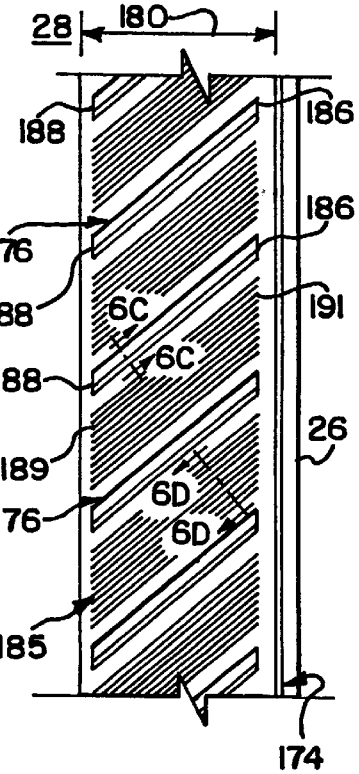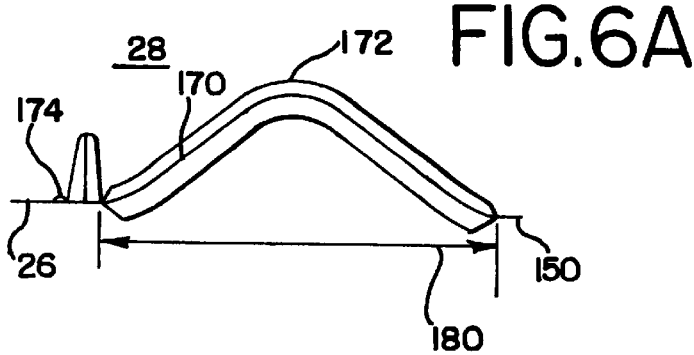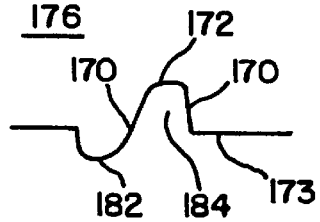

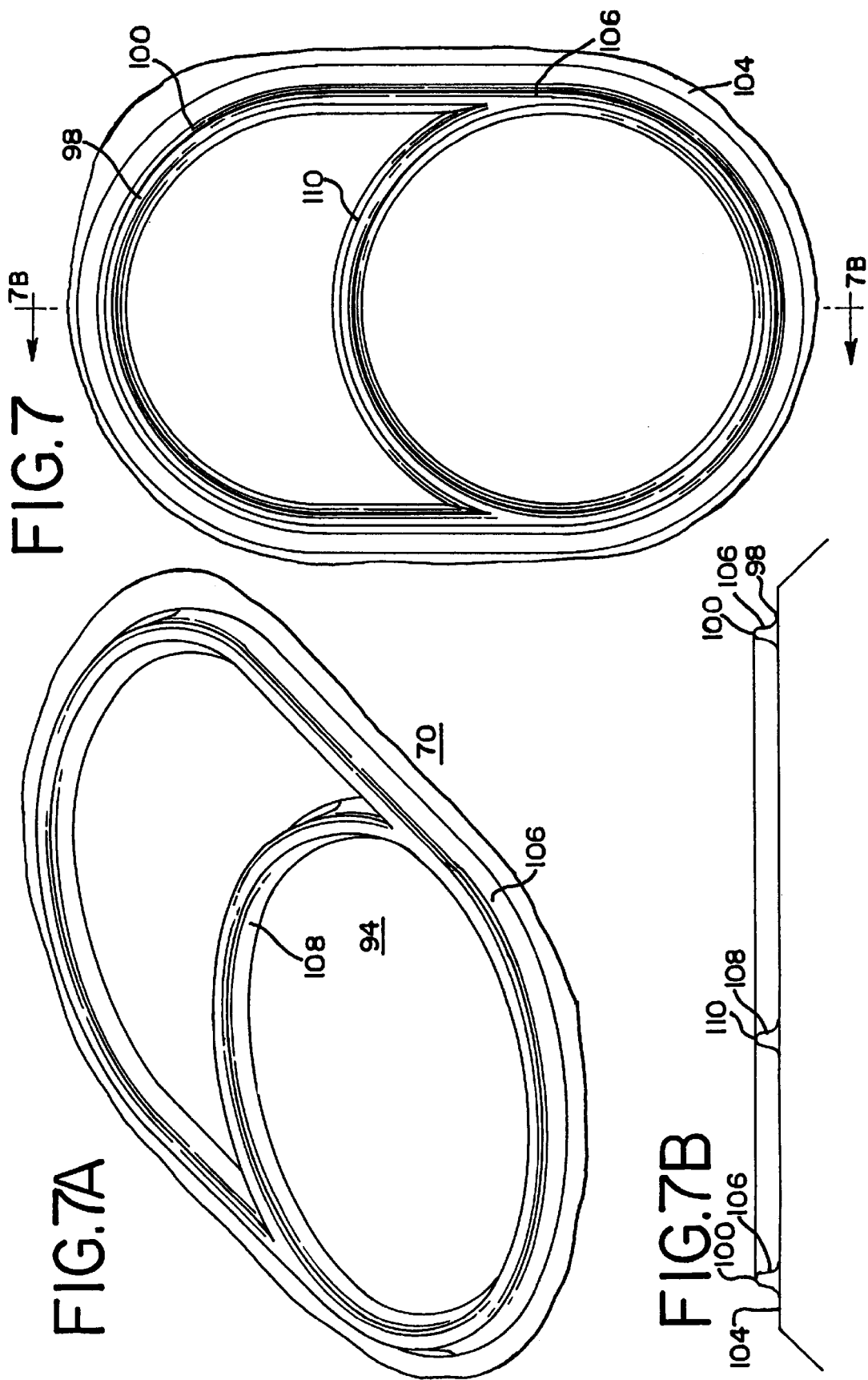

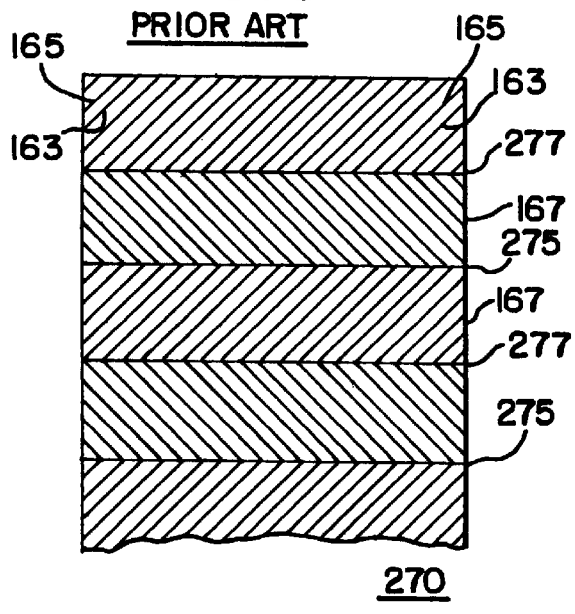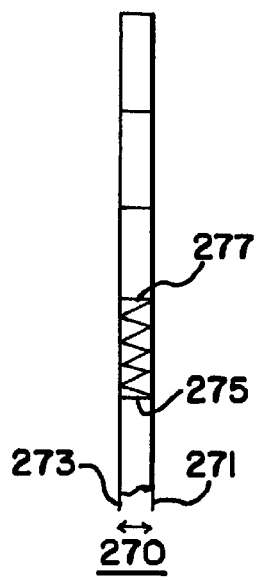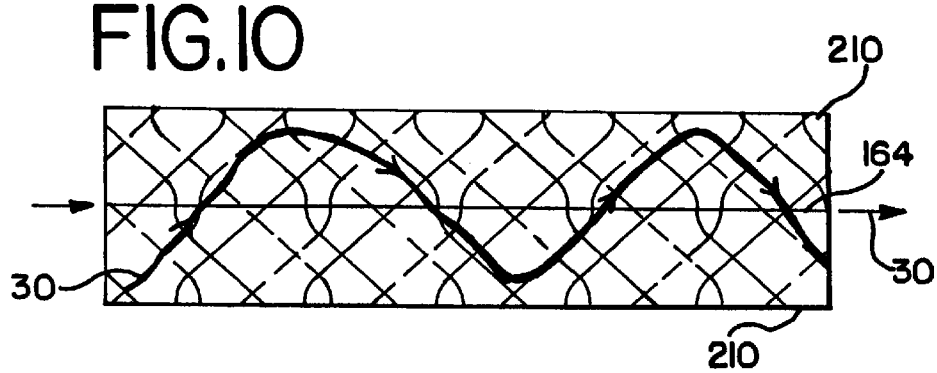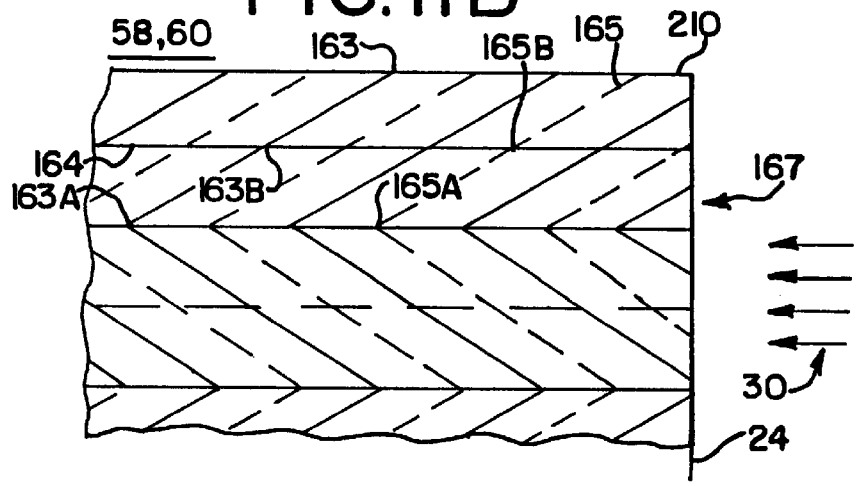

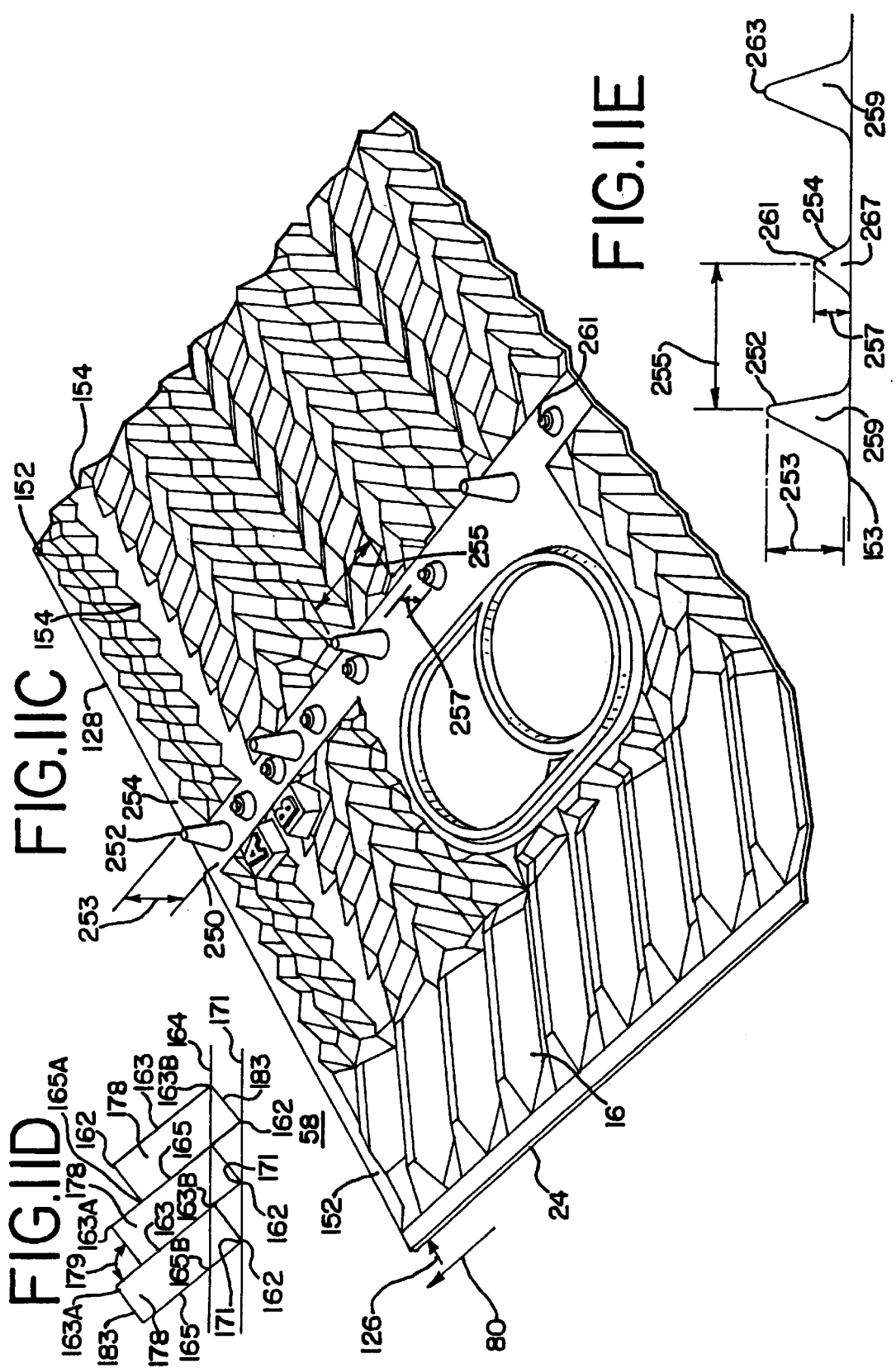

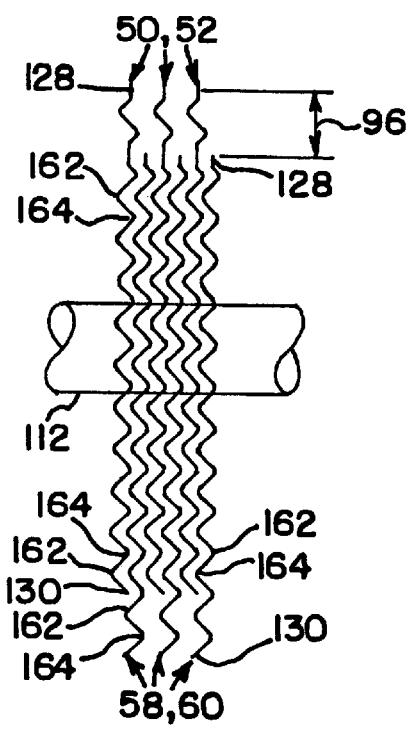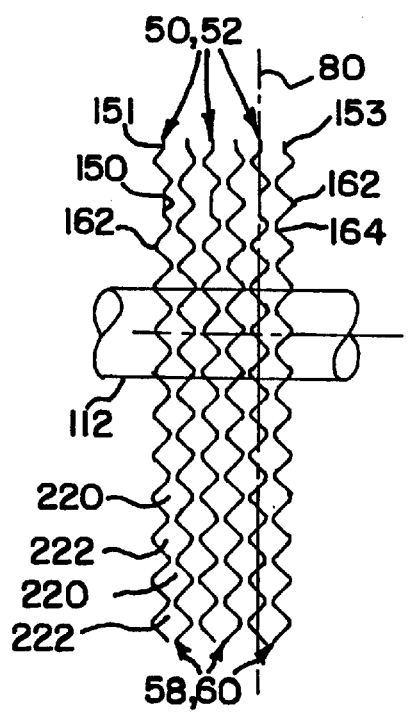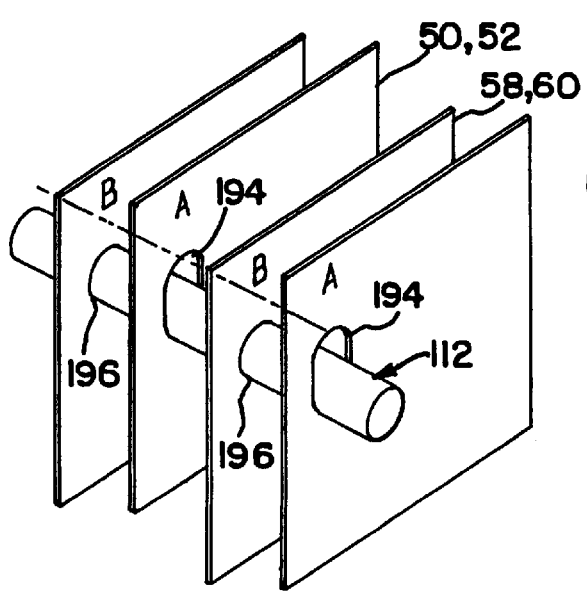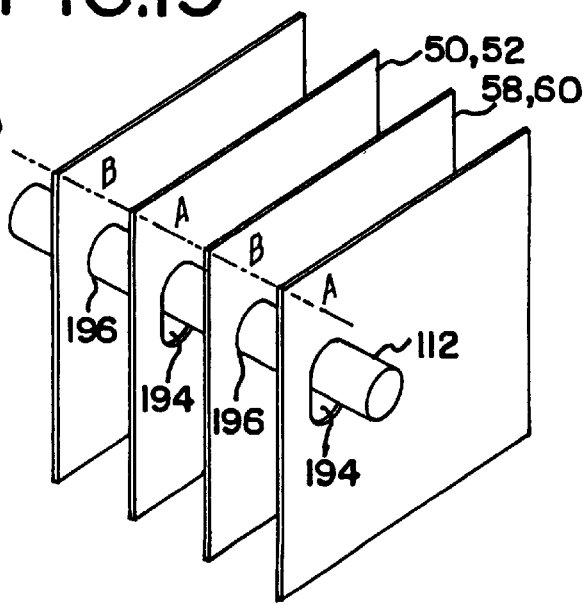

3 CYCLES

5 CYCLES

FILM FILL-PACK FOR INDUCEMENT OF SPIRALING GAS FLOW IN HEAT AND MASS TRANSFER CONTACT APPARATUS WITH SELF SPACING FILL-SHEETS

BACKGROUND OF THE INVENTION

The present invention relates to liquid and gas contact apparatus for heat transfer and mass transfer apparatus. More specifically, the invention relates to the heat and mass transfer media, or film fill-pack, utilized within the cooling tower as a liquid-to-gas contact apparatus to cool a heat-transfer fluid. The heat and mass transfer media, or fill-pack, material is generally vertically oriented with fluid coursing over the material and an air stream is transversely directed through the loosely nested or spaced fill-pack material to interact with the fluid for heat and mass transfer. The fill-pack material generally provides a structural apparatus inhibiting the rate of fluid flow between a fluid-feeding device at the upper portion of the tower to a sump at its lower level, which inhibited fluid-flow rate increases the contact time between the fluid and the transversely moving air or gas.

The control or inhibition of the liquid flow rate to increase the contact time with flowing gas or fluid may be considered liquid management as a reference term.

Various structures, materials and physical arrangements have been provided in an attempt to enhance the interaction between the gas or air and the fluid in fill-pack materials. This would promote the efficiency of the heat and mass transfer operation and thus the efficiency of heat and mass transfer devices, such as cooling towers. The thermal efficiency of a cooling tower is related to the mass of air flowing through the tower, the fluid-air interface per unit of fluid flowing through the tower, and also to the degree of turbulence of the flow of air and water adjacent to the interface. An attempt to accommodate a greater interaction between the air and fluid, and thus to increase the tower efficiency, is noted in U.S. Pat. No. 3,286,999 to Takeda. In this structure, alternative arrangements of corrugated ribbing in bands across the fill sheet are illustrated, that is with or without transverse blank strips, but both arrangements have hollow projections extending above the corrugated surfaces. The sheet material may be a polyvinyl chloride with a specified band width and groove inclination. A binder secures rice powder to the fill-sheet surfaces. It is asserted that the rice, or other material, acts as a wetting agent to spread the water on the face of the sheets. In addition, enhancement of the surface wetting is proposed by the addition of a surfactant to the water.

U.S. Pat. No. 4,548,766 to Kinney, Jr. et al. discloses a formed fill sheet for crossflow water cooling towers, which fill sheet has a repeating chevron pattern with the ridges on one sheet face defining the grooves on the other face. An improvement in the heat transfer is attributed to the angularity of the ridge sections with respect to each other, the vertical height of the pattern, the transverse angulartiy of the ridges and the spacing between the adjacent sheets. W-shaped spacers projecting in opposite directions from each of the sheets have complementary notches to receive the foot portions of the spacer to maintain adjacent sheets in required horizontally spaced relationships. These spacers are angled to provide minimum air-flow interference. The chevron shaped pattern repeats itself in alternating rows of angled ridges and grooves. However, there are circular grooves arranged along upright lines at opposite sides of the sheet and are operable as knockouts for receipt of supports bars. The use of the w-shaped spacers is asserted to aid assembly of the fill pack at the tower site by the avoidance of requisite gluing of the fill material.

U.S. Pat. No. 3,599,943 to Munters teaches a contact fill-material product with a corrugated structure of pleats or folds. The contact fill-materials are vertically positioned thin layers or sheets formed with pleats crossing each other in adjacent layers. The layers may be cellulose or asbestos impregnated with a stiffening or strengthening substance, such as a resin. The crossing pleats bear against each other to form channels with continuously varying widths both vertically and horizontally. This is purported to enhance air to water contact to more effectively cool the water. A similar glued together section of fill material is illustrated in U.S. Pat. No. 3,395,903 to Norback et al. The corrugated sheets of the material have the corrugations at an angle with the sheets joined together at their edges and providing channels between the corrugated layers.

A thin-sheet fill material with zigzag-shaped corrugations, which are bent transverse to its plane along a plurality of lines transverse to the corrugations, is shown in U.S. Pat. No. 3,540,702. A plurality of the sheets are joined back to back so that the bent portions of adjacent plates extend in opposite directions to form large flow passages for gas with the corrugations foring flow passages for a liquid.

Another illustration of an angularly grooved and corrugated fill sheet is taught in U.S. Pat. No. 4,361,426 to Carter et al. The angularly grooved fill material is spaced, horizontally extending, corrugated and vertically oriented with its surface enhanced by molded-in angular zigzag grooves. This material increases the exposed wetted surface area of the fill and causes turbulence of air in the passageways between the fill sheets. The purpose of the enhanced flow and surface areas was to increase air and water contact time to increase the thermal performance of the fill material.

A serpentine fill packing material is disclosed in U.S. Pat. No. 4,518,544 to Carter et al., which fill material is composed of individual side-by-side sheets having serpentine or sinusoidal shapes with crests or ridges. Adjacent sheets have the sinusoidal shapes in directly opposite paths. The sheets are supported or maintained in place by a spacing knob male locator on a ridge of any sheet and a spacing socket female locator within a valley of any sheet. The groove width constantly varies at a ridge or a valley from the bottom to the top edge. The sidewall angle of the groove relative to the perpendicular to the plane of the sheet is a constant angle at any position in the fill groove sheet height.

U.S. Pat. No. 4,801,410 to Kinney, Jr. et al. provides a vacuum formed fill sheet with spacing elements to maintain spacing about the perimeter and interior of the sheet. The individual fill-sheet pack are formed in a corrugated pattern with the peaks and valleys of adjacent sheets being inclined in opposite directions to maintain sheet spacing. Honeycomb structure formed along the facing and side edges of adjacent sheets assist in the maintenance of sheet spacing.

U.S. Pat. No. 5,722,258 to Aitken illustrates a fill package having corrugated metal elements arranged with vertical passages between adjacent elements. Perforations are provided in the corrugated sections of the fill material. The corrugations in each section extend at an angle to the horizontal. It is asserted in the disclosure that the corrugations function as fins to increase the heat transfer area.

SUMMARY OF THE INVENTION

The heat and transfer media, or fill-sheets, of the present invention particularly enhance the thermal efficiency of fill-sheets by providing the following: a specific structure displacing the adjacent rows of pleats or chevrons from immediate redundancy; automatic alignment of ridges on adjacent fill-sheets to clearly define airflow channels for the development of airflow vortices in each channel with adjacent channel airflow spinning in opposite directions; fill-sheet surface structures for compact storage, shipment and ease of assembly at a cooling tower site; clear and specific apertures for mounting and support rods with no secondary assembly or structure at a cooling tower site; separators for maintaining the separation distance between adjacent sheets without individual fill-sheet calibration; and, ease of continuous fill-sheet manufacture by vacuum forming of a thermoforming plastic. An angle of displacement of the corrugations or pleats on the fill-sheet surfaces is noted for the specific pleat relative to a vertical axis. The relative angular displacement of the fill-sheet during manufacture and the method to provide vertical displacement are easily integrated into the manufacture of the fill-sheet.

The noted manufacturing method provides the correct sequence or number of panels for producing fill-sheets with a continuous repeating pattern. The fill-sheets have a seal line between adjacent segments within a die or mold, but the individual mold may be set to provide a multi-panel fill-sheet or a single panel fill-sheet, or the die may provide a single elongated sheet. Both arrangements incorporate mounting passages and support-rod passages. The specific die configuration and formed fill-sheet size or utilization of multiple panels for a multi-panel sheet is a design choice.

BRIEF DESCRIPTION OF THE DRAWING

In the several figures of the Drawing, like reference numerals identify like components, and in those figures:

FIG. 1A is a diagrammatic cross-sectional view of a crossflow cooling tower as in FIG. 1;

FIG. 2 is an enlarged, oblique, sectional view of the film fill-pack of the crossflow cooling tower in FIG. 1;

FIG. 3A is a plan view of an as-formed fill sheet having a plurality of formed panels with the elliptically shaped mounting and support passages pierced, and a water retention louver on the front edge;

FIG. 3B is a plan view of an as-formed fill sheet as in FIG. 3A with the elliptically shaped mounting and support passages pierced, and the mist eliminator on the back edge;

FIG. 3C is a plan view of an as-formed fill sheet as in FIG. 3A with the circular mounting and support passages pierced, and a water retention louver on the front edge;

FIG. 3D is a plan view of an as-formed fill sheet as in FIG. 3B with the mist eliminator on the back edge;

FIG. 4B is an outline of a single panel fill sheet mold with the as-formed water retention louver section on the front edge;

FIG. 6A is a cross-sectional view of the mist eliminator portion taken along the line 6—6 in FIG. 4A;

FIG. 6B is an enlarged plan view of a segment of the mist eliminator;

FIG. 6C is an enlarged cross section of a mist eliminator louver as taken along the line 6C—6C in FIG. 6B;

FIG. 6D is a cross-sectional view of the microgrooves between the louvers of the mist eliminator taken along the line 6D—6D in FIG. 6B;

FIG. 7 is an enlarged plan view of the as-formed combination ellipse and circular support-passage outlines in FIGS. 3A to 3B;

FIG. 7A is an enlarged oblique view of the ellipse and circular support passage outlines of FIG. 7;

FIG. 7B is a cross-sectional outline of the ellipse and circular support passage of FIG. 7;

FIG. 8 illustrates a prior-art, chevron-shaped plan view of a fill-sheet;

FIG. 8A is a side view of the prior art fill sheet illustrated in FIG. 8;

FIG. 10 is an enlarged view of a channel with an air flow spiral therein;

FIG. 11B is an enlarged plan view of another of the fill-sheets as in FIG. 9 with a two-cycle surface;

FIG. 11C is an oblique perspective view of a portion of a fill-sheet;

FIG. 11D is an end view of a fill-sheet surface taken along a line parallel to the line 13—13 in FIG. 11A;

FIG. 11E is an enlarged sectional view of the separators and nodules of the surface in FIG. 11C;

FIG. 16 shows the as-manufactured fill sheets closely nested with a peak to valley mating between adjacent sheets;

FIG. 17 is an enlarged and exploded view as manufactured fill sheets of FIG. 16;

FIG. 18 illustrates the installed fill sheet alignment with the sheets suspended from a hanger pipe;

FIG. 19 is an enlarged and exploded view of the as-assembled fill sheet alignment as in FIG. 18;

DETAILED DESCRIPTION OF THE PREFERRED EMBODIMENT

Figure 1:
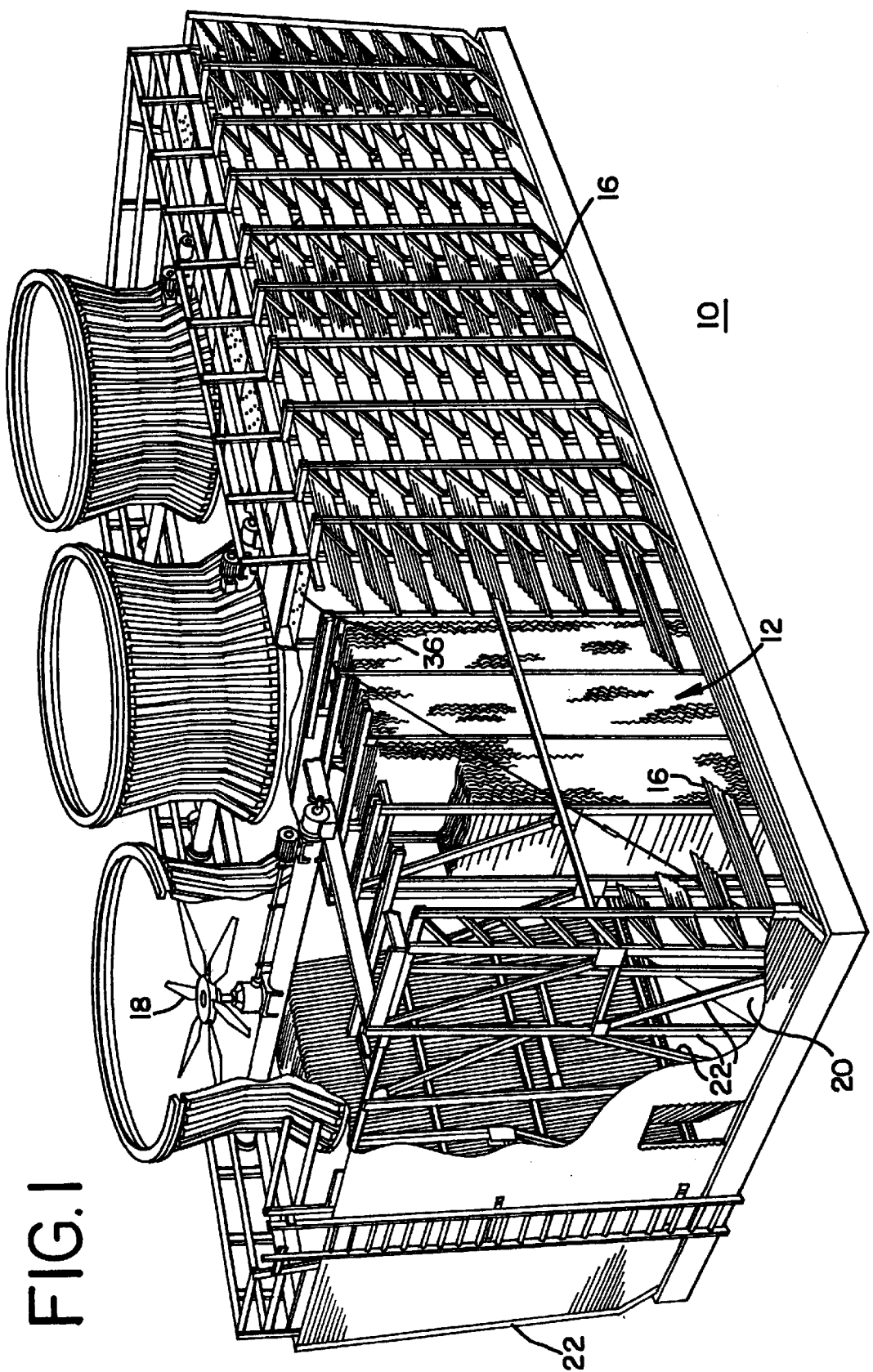
FIG. 1 is an oblique and partial sectional view of an extant, crossflow cooling tower and film fill-pack.

Heat and mass transfer media are utilized in a plurality of heat and mass transfer devices including cooling towers, catalytic converters, gas scrubbers, evaporative coolers and other apparatus. In FIGS. 1 and 2, extant crossflow cooling tower 10 is shown in a partial cross-sectional view noting several components of tower 10. More specifically, film fill-pack 12 with a plurality of individual heat and mass-transfer media, or fill-sheets, 14 are shown along with independent water-retention louvers 16, tower fan 18, sump 20 and several structural support members 22. The portion of tower 10 in dashed outline of FIG. 1 is noted in FIG. 2 in an enlarged view. Fill-packs 12 have a plurality of individual parallel fill-sheets 14 vertically suspended in tower 10. Outer or front surface 24 of fill-packs 12 is in proximity to independent water-retention louvers 16 and inner or back surface 26 is in proximity to fan 18. Fill-sheet lower edge 130 of FIG. 4B is in proximity to sump 20 in FIGS. 1, 1A and 2.

The relative position of the cooling-tower components, the air-flow direction and the water-flow direction of cooling tower 10 are more clearly illustrated in FIG. 1A. In this schematic figure, air flow direction is noted by arrow 30, water or fluid flow direction is shown by arrows 32 within fill-pack 12 and discharge or warmed air or gas flow is indicated by arrows 34. Mist eliminators 28 are integrally formed with fill sheets 14 and are generally located at back edge 26. Water distribution basin 36 at tower top 38 has distribution nozzles 40 for uniform distribution of warm water over fill packs 12, which basins or conduits 36 are also noted in FIG. 1. Cooling towers 10 reduce the temperature of water utilized in cooling systems, and the temperature reduction is generally accomplished by transferring air at a first temperature past water coursing over fill-sheets 14, which water is at a second and higher temperature. The cooler air reduces the water temperature through both sensible heat transfer and latent heat transfer by evaporation of a small portion of the water on the fill-sheet surface. The water through fill-sheets 14 is recovered in sump 20 for recycling to the noted cooling system. It is generally considered correlative that cooler water temperatures in sump 20 result in a more efficient or more economical operation for a cooling system.

FIG. 8 illustrates a prior art fill-sheet 270 in plan view, which fill-sheet has a plurality of alternating rows of aligned chevron-like ribs or corrugations on its surface. In the vertical, herring-bone arrangement of fill-sheet 270 noted in the figure, the darker and heavier lines represent ridges 163 and the alternating lighter, thinner lines represent valleys or grooves 165 between adjacent ridges 163 of a horizontal row of ridges 167. The bands of ridges in each row 167 are angled in alternate directions to direct the flow of water down the surface of fill-sheet 270. Obverse surface 271 and reverse surface 273 of prior art fill-sheet 270 are shown in the side view of FIG. 8A, and they appear as planar surfaces. Although operable, the surfaces did not cooperate with adjacent fill-sheet surfaces to provide clearly defined air-channels for enhancing airflow and the generation of airflow spiraling. Surfaces 271 and 273 of prior-art fill-sheets 270 will have plan view linear valleys 275 and lines of peaks 277 in planar surfaces 271 and 273. In an embodiment not illustrated, projections may be provided to maintain separation between adjacent sheets.

Crossflow cooling tower 10 will be utilized as a reference structure for the following description of the preferred embodiment with fill-sheets 14 of media or film pack 12 unless otherwise noted. Fill-sheets 14 are frequently utilized as media 12 for heat transfer and mass transfer equipment. Alternative arrangements of fill-sheets 14 of the present invention are noted in FIGS. 3A to 3E, and more specifically, it is considered that the illustrated fill sheets 14 in FIGS. 3A and 3B, as well as 3C and 3D, are, or may be, assembled as side-by-side pairs. The resultant fill-sheet structure of side-by-side assembly, that is fill-sheets 50,52 and 58,60, would provide a sheet structure similar to the form of single and continuous fill-sheet 14 shown in FIG. 3E. These side-by-side fill sheet structures can provide greater widths along lower edge 154 in FIGS. 3A to 3B. The resultant fill-sheet 50,52 or 58,60 remain similar to single panel fill-sheet 14 both functionally and structurally.

Figure 3E:
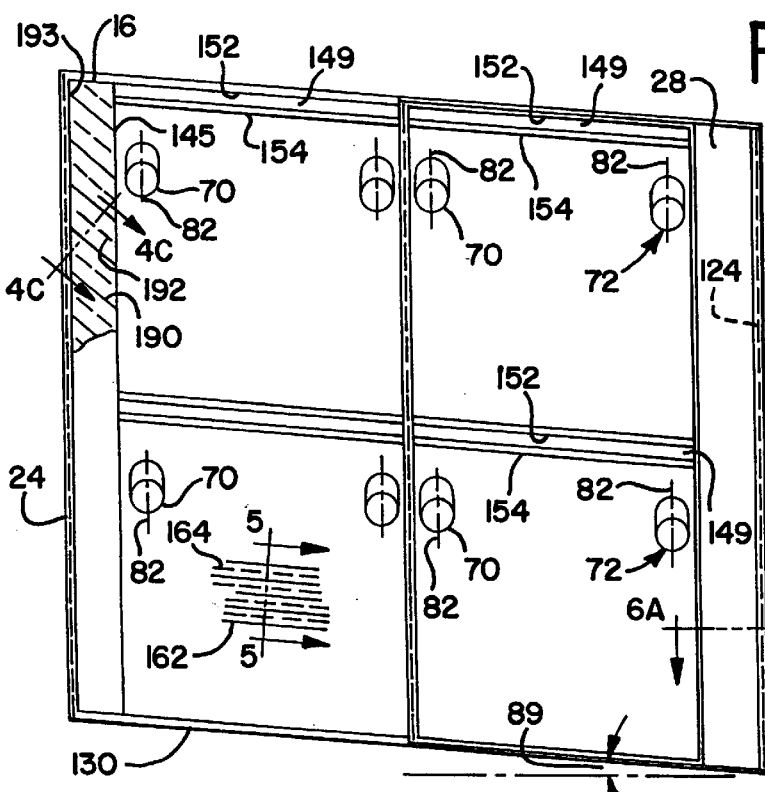
FIG. 3E is a plan view of an as-formed fill sheet with a water retention louver at the front edge and a mist eliminator at the back edge.
Figure 5:
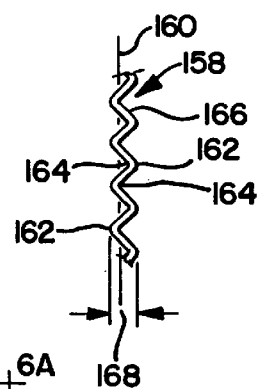
FIG. 5 is a cross-sectional view of the fill section taken along the line 5—5 in FIGS. 4A and 4B.

The specific structures of fill-sheets 14 in FIGS. 3A through 3E are illustrative of as-manufactured fill-sheets 14, which illustrations are exemplary and not limitations. In FIGS. 3A and 3B, fill-sheet pair 50 and 52 is shown with six fill-sheet panels 54 and 56, respectively, which sheets 50,52 cooperate to provide a first or A fill-sheet 14 of a film-pack 12. Fill-sheet pair 58 and 60 with panels 54 and 56 of FIGS. 3C and 3D, respectively, are similarly assembled to provide a second or B fill-sheet 14 of the same film-pack 12. Fill-sheets 50, 52, and 58, 60, in the above-noted, side-by-side relationship are shown with integrally formed water-retention louvers 16 at front or air-inlet side 24, and integrally formed mist eliminators 28 at back or air-outlet side 26.

Figure 14:
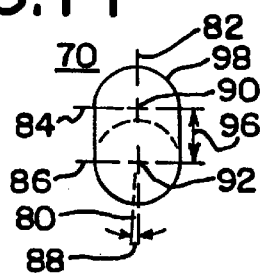
FIG. 14 illustrates an elliptical or elongate shaped outline on each panel of each fill-sheet, and noted in FIGS. 7 to 7B.
Figure 15:
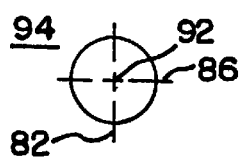
FIG. 15 is the circular outline within the ellipse of FIG. 14.

Each of panels 54 and 56, or fill-sheet 14 in FIG. 3E, has mounting passages 70 and 72 outlined on the basic sheet or panel 54, 56 and 14, which are illustrated in FIGS. 7, 7A, 7B, 14 and 15. In these figures, only passage 70 will be described, but the description will be applicable to passage 72. Passage 70 in FIG. 14 has a generally elliptical shape, which has major axis 82, first minor axis 84 and second minor axis 86. Major axis 82 is shown as offset at an angle 88 from longitudinal or tower vertical axis 80, which is noted in FIGS. 1A, 3A and 3B. In FIGS. 3A to 3D, passages 70 and 72 have major axes 82 generally parallel to side edges 24 and 26, which are also displaced from vertical axis 80 by angle 88. In FIG. 14, elliptical outline of passage 70 has first focus 90 and second focus 92, which are separated by gap distance 96. Circle 94 in FIG. 15 has a vertical diameter along major axis 82, a transverse diameter along minor axis 86, as an illustration, and its center is noted at focus 92 within passage 70. A more geometrically accurate description of passage 70 in FIG. 14 notes a first circle outline with a center at focus 90 and a second circular outline with a center at second focus 92. The intersection of diameters 84 and 86 of these respective circles at perimeters or circumferences 98 are joined by tangent lines. These passage structures broadly imply a generally elliptical or elongate shape in the drawing and are thus noted for this description.

In FIG. 7, ellipse perimeter 98 has ridge outline 100. Fill-sheet 14 in FIGS. 7 and 7B has unformed planar surface 104 in proximity to ridge 100 with upwardly sloping sidewall 106. Ridge 100 and sidewall 106 cooperate to provide perimeter 98 of outline 70. Similarly, inner formed sidewall 108, which meets tangentially with sidewall 106 at the intersection of diameter 82, is the arced outline of circle 94 with inner ridge 110. Ridges 100 and 110, as well as their respective sidewalls 106, 108, act as reinforcing or strengthening members for receipt of support rods 112, which are shown in FIGS. 16, 17, 18 and 19, through pierced outlines of ellipse 70 and circle 94. The cross-sectional view of elliptical outline 70 and circle 94 in FIG. 7B notes ridges 100 and 110, as well as sidewalls 106, 108.

Figure 14A:
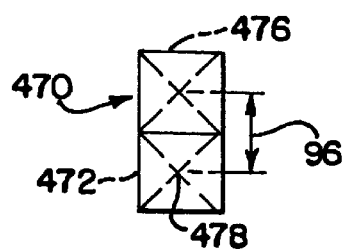
FIG. 14A illustrates a rectangular outline for each panel of each fill-sheet in an alternative embodiment.
Figure 15A:
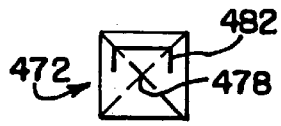
FIG. 15A is a generally square section within the rectangular outline of FIG. 14A, with a superimposed alternative and exemplary support rod structure.

Mounting passages 70 and 72 are shown in the several figures which are curved forms as an illustration and not a limitation. Passages 470 and 472 are shown in FIGS. 14A and 15A with generally rectangular forms. More specifically, passage 470 appears as contacting square outlines stacked upon each other. Diagonals 474 of the respective squares intersect at foci 476 and 478 with separation gap 96 therebetween. In this alternative structure, a rectangular or C-shaped channel 482 is utilized as a support rod.

Figure 4C:
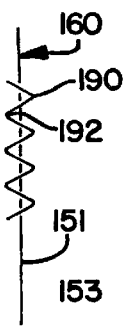
FIG. 4C is a cross-sectional view of the water retention louvers taken along the line 6A—6A in FIG. 4B.
Figure 4A:
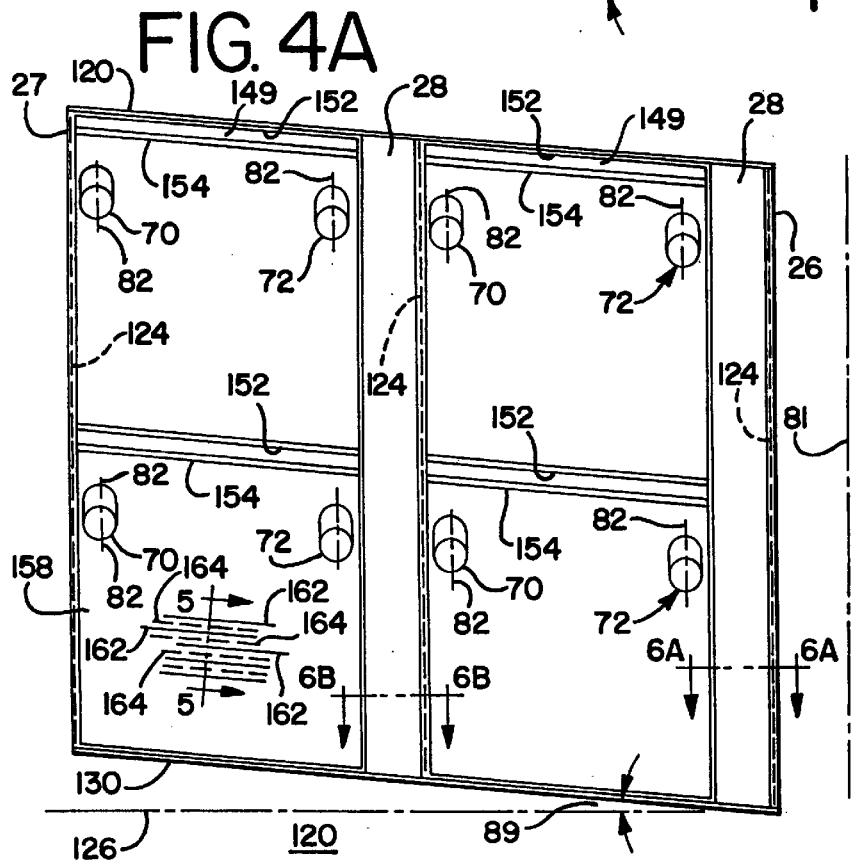
FIG. 4A is an outline of a two-panel fill sheet mold for the with the as-formed mist-eliminator side edges parallel to the vertical or longitudinal direction, the top and bottom edges are angularly displaced from the horizontal axis and noting the parting line for separating the as-formed two-panel section from the adjacent two-panel section.
Figure 9:
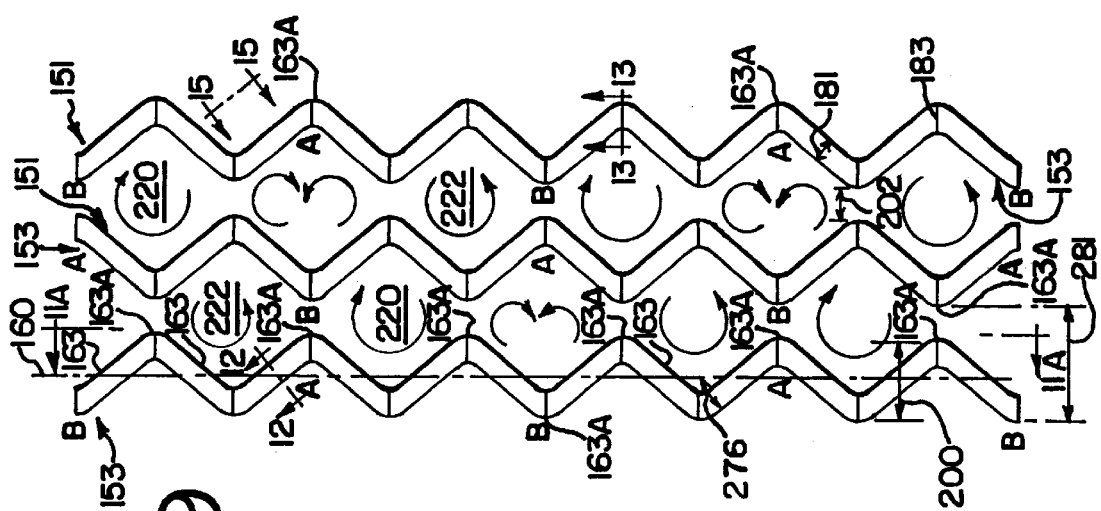
FIG. 9 is an enlarged end view illustration of three assembled fill-sheets with the aligned peak-to-peak arrangement providing channels between the aligned valleys generally taken along the lines 5—5 in FIGS. 4A and 4B.
Figure 11A:
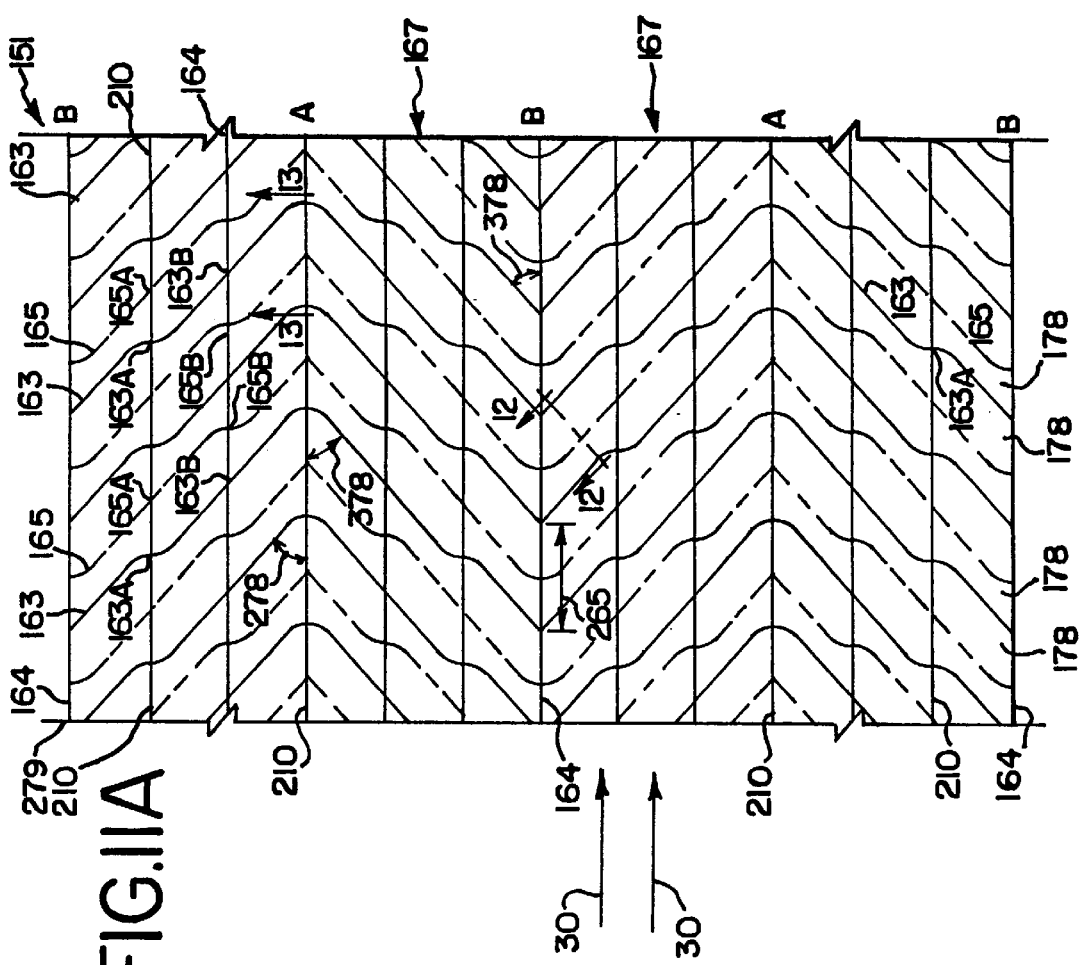
FIG. 11A is an enlarged plan view of one of the fill sheets in FIG. 9 with a three-cycle surface.

Molds 120, 122 in FIGS. 4A and 4B provide a field or array of corrugations or chevrons 158 formed on sheet 150, which field 158 has an iterative outline with a plurality of rows of chevron-like shapes. In FIG. 9, a schematic cross-sectional view of corrugated or chevron field 158 of planar sheet 150 refers to the array of peaks and valleys of obverse surface 151 and reverse surface 153. Field 158 in FIGS. 9 and 11A is shown for three-cycle fill-sheets, which corrugated field 158 generally has the shape of an array of inclined planes to vertical axis 160. Field 158 is shown as a smooth continuous curve in FIG. 9 with sloped faces or ridges 163 and peak-to-peak profile depth 200 between peaks or apices 163A on either side of planar sheet 150. In FIG. 9, the faces of adjacent fill-sheets 14 are labeled as obverse face 151 and reverse face 153. However, chevron field 158 is repeated on both sides of sheet 150 and the description of field 158 generally relates to either surface 151 and 153. Array or field 158 appears to cycle about neutral axis 160 with peaks 163A and linear valleys 164, which axis 160 is coplanar with planar surface 150 and about normal to horizontal axis 126.

In the several figures above, fill-sheets 14 or 50,52 and 58,60 have been broadly described with corrugated or chevron-shaped top or obverse face 151 and bottom or reverse face 153. The chevrons provide an undulating surface with a repetitive peak, or apex, and valley pattern on both obverse or top face 151 and reverse or bottom face 153 of each fill-sheet 14 or 50,52 and 58,60. This pattern is generally equivalent on both obverse surface 151 and reverse surface 153, therefore, only obverse surface 151 will be described but the description will generally apply to field 158 of reverse surface 153. Further reference will only be to fill-sheets 50,52 and 58,60, but the description will generally apply to single fill-sheet 14. The side-by-side assembly of the sheet structures of FIGS. 3A and 3B are noted as a first or A-structure. Similarly, a second or B-structure is denoted by the side-by-side arrangement of the sheet structures in FIGS. 3C and 3D. The distinguishing characteristic between these noted A and B structures is the specific mounting passages pierced through outlines 70 and 72. More specifically, the A-sheet mounting passages have the elliptical pattern outlined by perimeter ridge 100 pierced to provide aperture 194 in FIGS. 3A, 3B, 17 and 19. The B-sheet mounting passages have circle outline 94 pierced to provide circular ports 196, as shown in FIGS. 3C, 3D, 17 and 19. In addition, A-sheet structures are sheared or cut to length by shearing along one of the definitional or shearing lines 152, while the B-sheet structures are provided by shearing along one of the definitional or shearing lines 154. The specific shearing line 152 or 154 utilized in the as-produced continuous sheet sequence of fill-sheets 50,52 or 58,60 and 14 is determined by the number of panels 54 and 56 required to provide a design length for fill-sheets 50,52, and 58,60 and 14. The same number of panels are generally provided for both the A and B structure fill-sheets.

Mounting passages 70 and 72 are pierced to receive mounting rods 112. However, the outline or shape of as-pierced aperture 194 is an ellipse and the shape of port 94 is a circle. In FIGS. 17 and 19, A-sheet structures 50,52 and B-sheet structures 58,60 have mounting rods 112 extending through a plurality of parallel and alternating fill-sheets. In FIGS. 16 and 17, side-by-side sheet structures 50,52 are positioned on rod 112 extending along focus 92 of each aperture 194. In these positions along focus 92, the chevron pattern surfaces 151, 153 of each fill-sheet may be mated against or nested with adjacent fill-sheet surface 151 or 153 after manufacture for ease of packing and shipping. This tightly configured arrangement of fill-sheets 50,52 and 58, 60, or 14 is shown in FIG. 16 with side-by-side sheets 50, 52 and 58,60 having their respective corrugated surfaces 151 and 153 closely nested. Top edges 128 of fill-sheets 50,52 are upwardly displaced by gap distance 96 from top edges 128 of fill-sheets 58,60. A similar edge displacement gap 96 is noted at bottom edge 130 of the tightly packed sheets in FIG. 16, which gap distance 96 is associated with the original shearing position and the alternatively pierced apertures 194 and ports 196. This small offset or gap 96 is only about three percent of the mold length, which is significantly less than the present use of about fifty percent of the mold length for nesting or mating fill-sheets 14 for storage and shipment. Thus fill-sheets 14 require significantly less storage space and the shortened length is considered to ease handling.

When fill-sheets 50,52 and 58,60 are closely packed or nested, lines 210 of peaks or apices 163A of a first fill-sheet obverse face 151 can nest into linear valleys 164 of an adjacent second fill-sheet reverse face 153, thereby reducing the bulk volume occupied by a collection of fill-sheets 50,52 and 58,60 or 14 provided for film-pack 12. It is understood that lines 210 appear as a continuum in FIG. 11A, but peaks 163 A may be discrete, as shown in FIG. 11D. The nested fill-sheets 50,52 and 58,60 enhance the stability and strength of individual fill-sheets, while improving the handling and reducing the shipping volume prior to on-site assembly. The tightly configured sheet arrangement is also considered to improve the strength of fill-sheets 50,52 and 58,60, which avoids damage during storage and transport.

At assembly or mounting of film-packs 12 in tower 10, film-packs 12 are vertically suspended, and fill-sheets 50,52, which have an A-style structure, move downward to provide support rod or rods 112 along focus 90 of each aperture 194. Sheets 58,60 are mounted on rod 112 along focus 92 and maintain that location in both the nested arrangement and in the as-assembled state of sheets 50,52 and 58,60, which thus aligns foci 90 and 92 of alternating A and B fill-sheets 50,52 and 58,60, respectively. The resultant alignment of alternating A and B style fill-sheets 50,52 and 58,60, their apertures 194 and ports 196, and thus their respective foci 90,92, is noted in FIG. 19 for several representative fill-sheets 50,52 and 58,60.

On-site assembly provides alternating sheets in the profiled alignment of FIG. 18, and in this configuration of film-pack 12 top edges 128 of all fill-sheets 50,52 and 58,60 are in substantial alignment. Similarly, fill-sheet bottom edges 130 are aligned, which alignment is achieved by the downward displacement of aperture 194, as gap distance 96 is equivalent to separation gap 149 between shear lines 152 and 154. The geometry of gap 96 and separation gap 149 provides peaks 163A on an obverse face 151 of a first A or B fill-sheet 50,52 and 58,60 in proximity to peaks 163A on a reverse face 153 of an adjacent and opposite A or B fill-sheet 50,52 and 58,60. The relationship of the fill-sheet, peak-to-peak proximity and alignment is schematically illustrated in FIGS. 9 and 18.

In FIG. 18, film pack 12 has been vertically suspended to allow fill-sheets 50,52 and 58,60 to assume their assembled position and relationship. As noted above, vertical suspension of film-pack 12 in a tower 10 allows A-sheet structures 50,52, which have hanger rod 112 through elliptical apertures 194, to move vertically downward to position rod 112 generally along foci 90 in apertures 194 while maintaining B-sheet structures along focus 92. This orientation of A-sheet structures 50,52 and B-sheet structures 58,60 horizontally aligns upper edges 128 and lower edges 130 of fill-sheets 14 and provides film-pack 12 with a substantially outer appearance at edges 24 similar to the structure of film-pack 12 noted in FIGS. 1 and 1A. Lower edges 130 are illustrated as aligned in FIG. 18, but alternative manufacturing methods may have the noted A-sheet and B-sheet structures of unequal lengths, which would provide top edges 128 in alignment without aligning bottom edges 130.

The above-noted side-by-side sheet structures 50,52 and 58,60 are related to the fill-sheets shown in FIGS. 3A to 3D with individual panels and the requisite side-by-side abutment needed to accommodate the fill-sheets provided by these structures. It is iterated that fill-sheets 14 may be a single sheet structure, as shown in FIG. 3E, with multiple vertical panels arranged to provide a desired sheet length. The choice of single sheet or side-by-side panel structures is a design and application election and not a functional limitation. Therefore, the following description of faces 151 and 153 and the resultant relationship of peaks 163A and linear valleys 164 will also be applicable to fill-sheet structures provided by assembly of single-sheet fill-sheets 14 shown in FIG. 3E.

The following discussion generally relates to adjacent fill-sheet obverse and reverse surfaces. However, it is recognized that outboard facing surfaces 151 or 153 of outboard fill-sheets 50,52 and 58,60, which are the outer surfaces of an individual film-pack 12, do not have facing surfaces from an adjacent fill-sheet 58,60 or 50,52, respectively, as noted in FIG. 18. The width of a film-pack 12 is not limited to a specific number of fill-sheets but may be any acceptable width and number of fill-sheets 50,52 and 58,60, or 14, to accommodate an application or cooling tower. However, adjacent fill-sheets 50,52 and 58,60 are parallel, and the internal fill-sheet peaks 163A of an A or B first-sheet, obverse face 151 are in proximity to and aligned with peaks 162 of an adjacent, A or B, second-sheet, reverse face 153. Linear valleys 164 of facing surfaces 151, 153 of adjacent A and B fill-sheets 50,52 and 58,60 are aligned similarly to lines 210 of peaks 163A, which linear valleys 164 occur between aligned and adjacent peak lines 210. These alignments are evident in FIGS. 9 and 11A. As the relationship between A and B fill-sheets 50,52 and 58,60, and related peaks 163A and linear valleys 164 is the same, only a single pair of sheets 50,52 and 58,60 will be described, but the description will be applicable to the remaining A or B fill-sheets 50, 52 and 58,60.

Aligned peaks 163A and linear valleys 164 in FIGS. 9 and 18 cooperate to form a plurality of channels 220, 222, which are generally horizontal. It is recognized that apertures 194, ports 196 and separation gaps 149 create discontinuities in patterned channels 220, 222. However, the general pattern of channels 220, 222 will be present between facing surfaces 151 and 153 of adjacent fill-sheets 50,52 and 58,60 or 14.

Surfaces 151 and 153 are not flat and more specifically, obverse surface 151 in FIG. 11A has a plurality of continuous ridges 163 progressing vertically downward from linear valley 164 from fill-sheet top edge 279. Ridges 163 project out of plane 150 to peaks 163A in line 210. Ridges 163 are downwardly angled or sloped on surface 151 at spin angles 278 and 378 to horizontal lines 164 and 210 and progress between peaks 163A or peak line 210 into plane 150 to ridge base 163B at linear valley 164. Ridges 163 continue up from ridge base 163B and linear valley 164 to next peak 163A at subsequent peak line 210. The undulating movement of each ridge 163 continues into and out of planar sheet 150, however, in FIG. 11A ridge 163 veers at approximately a ninety degree angle after progressing through three rows or half-cycles 167 of ridges 163. Angles 278 and 378 are preferably about 49°, but it has been found that spin angles 278 and 378 may vary between about 25° and 75° to provide a permissible spin angle for gas flow through channels 220 and 222.

Spin angles 278 and 378 are provided by viewing the plane of surfaces 151 or 153 in a perpendicular direction, as noted by double arrowed line 15—15 in FIG. 9. Spin angles 278 and 378 provide the proper spin to the spiraling air-flow, as excessive spin will induce an excessive pressure drop through channels 220 or 222, but inadequate spin will not induce the requisite spiral air with channels 220 or 222. In addition, excessive spin has been found to induce air movement between channels 220 or 222, which inhibits smooth operation and air transfer through fill pack 12. It is to be noted that spin angles 278 and 378 do not have to be of equal value.

Grooves 165 in FIG. 11A are noted between adjacent ridges 163 and they progress down obverse face 151 generally parallel to the projected lines of ridges 163. In this figure, grooves 165 are continuous lines projecting down from a line 210 of peaks 163A into plane 150 and below linear valley 164 to primary valley 165B. Groove 165 continues vertically down surface 151 in FIG. 1A and simultaneously out of plane 150 to intersect line 210 at upper point 165A below the apex of adjacent ridge peaks 163A. Groove 165 thus progresses vertically down obverse surface 151 in an almost parallel manner to ridges 163. Although upper point 165A is noted as a discrete point, the depth below apex 163A may be very nominal and almost indiscernible. This results in the appearance of a continuous line 210.

FIG. 9 may be considered a cross-sectional view of fill-sheets 50,52 and 58,60, and in this figure reverse face 153 of first or A sheet 50,52 is in facing alignment with obverse face 151 of second or B sheet 58,60. Peaks 163A of facing surfaces 151, 153 are in close proximity to each other. In this figure, line 210 of peaks 163A and linear valleys 164 appear as continuous lines or projections in a side view from either of edges 24 and 26. Linear valleys 164 are the intersection of the downward slopes of adjacent ridges 163 on surfaces 151, 153, which ridges 163 in this side view are at first angle 276 to neutral axis 160 or planar surface 150. First angle 276 is preferably about 40° from neutral axis 160, but it may extend between about 20° and 60°. Discrete peaks 163A in continuous arrays 158 on obverse surface 151 and reverse surface 153 cooperate to provide peak lines 210 in FIGS. 11A, 11B and 11C.

FIG. 11C is an oblique, perspective view of fill-sheets 14, however, the various angles, ridges 163, peaks 163A, ridge bases 163B, grooves 165 linear valleys 164 and, primary valley 165B will be individually described to properly provide them within the context of an individual fill-sheet. Repeated reference to FIG. 9 will be utilized to orient the location of angles, planes, ridges, valleys and peaks to be further described with regard to compound angles. As noted above, fill-sheets 14 or 50,52 and 58,60 have a plurality of projecting and angled planes, ridges, valleys and peaks, which result from forming planar materials at compound angles in a three dimensional array. Neutral axis 160 is coplanar with unformed planar sheet 150 and parallel to vertical axis 80, which planar sheet or surface 150 is noted in FIG. 6A. In FIGS. 5, 9, 11A, 11B, 16 and 18, peaks 163A project at equal distances above planar surface 150 of obverse and reverse faces 151,153. Peaks 163A occur at the junction of two ridges 163 of adjacent ridge rows or ranks 167, which ridges 163 have associated sidewalls 178. In the plan views of FIGS. 11A and 11B, linear valley 164 and primary valley 165B appear colinear, as the corners of the parallelograms forming the ridges, valleys and peaks are all colinear with these respective ridges and valleys.

Figure 12:
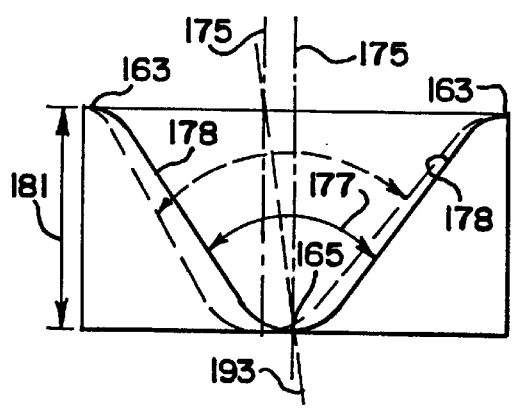
FIG. 12 is an enlarged cross-sectional view of a valley and the ridge peaks of adjacent flutes taken along line 12—12 in FIG. 11A, which planar location of line 12—12 is also noted in FIG. 9.

In the several figures of the preferred embodiment, sidewalls 178 are approximately parallelogram shapes angularly projecting from plane 150 as noted in FIG. 11D. FIG. 12 is a sectional view illustrating a true view of the as-formed relationship between sidewalls 178, groove 165 and elevation or height 181 of an as-formed chevron along ridge 163. Heights 181 and 183 are not equivalent in FIG. 9, but they may be equivalent in a specific structure of array 158. Angle 179 between sidewalls 178 is equally disposed on either side of normal 175 to groove 165 in FIG. 12. Alternatively, angle 179 may be unequally disposed from vertical axis 175 and offset as noted by the dashed line in FIG. 12, to one side or the other of axis 175 at a fixed angular displacement or bias from axis 175. As a consequence, one of sidewalls 178 would be longer than the other of sidewalls 178. Bias angle 193 may vary between 0° and 20° in either direction from axis 175. In a preferred embodiment, enhancement angle 179 between sidewalls 178 is 110° and height 181 is 0.137 inch with a 0° bias angle 193. Enhancement include angle 179 may vary between about 75° and 145°.

Figure 13:
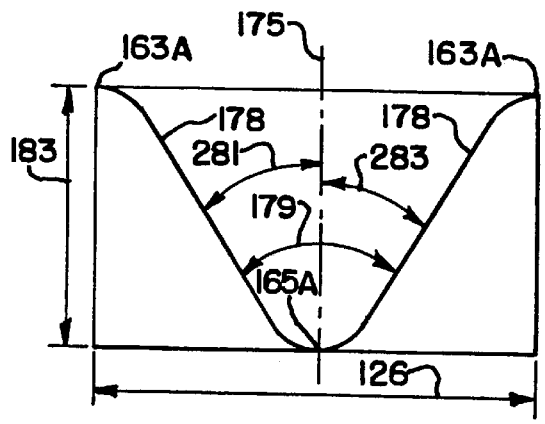
FIG. 13 is an enlarged view of a sheet surface between peaks taken along a line 13—13 in FIG. 11A, which planar location of line 13—13 is also noted in FIG. 9.

In the exemplary parallelogram structure noted in FIG. 11D, sidewalls 178 are shown as generally rectangular outlines and may be considered to have a first and longer side along groove 165 and, a second and parallel longer side coinciding with ridge 163. In FIGS. 9 and 11D, third and shorter side 183 extends from linear valley 164 to primary valley 165B. The parallelogram shapes are broadly noted in plan view in FIGS. 11A and 11B with alternate dashed and solid outline perimeters along ridge 163, groove 165, linear valley 164 and peak line 210. However, angular displacement of the parallelogram shape is noted in FIG. 13, which is a sectional view taken along a peak line 210 and specifically between adjacent peaks 163A. The general shape of groove 165 is similar to the illustration of FIG. 12. However, angle 179 is 118° and larger than angle 177, and height 183 in a specific example is 0.171 inch, which is greater than height 181. This effect from angle 179 being greater than angle 177 can be considered by viewing valley vertical axis 175 in FIGS. 12 with equal angular displacement on either side of axis 175 to provide angle 177. Alternatively, in FIG. 13, the angular displacement 287 on one side of axis 175 is greater than angle 283 on the other side of axis 175. This results in a smaller or shorter sidewall 178 in proximity to the angle 281 on one of the sides, but a greater angular displacement 281.

In FIG. 11D, each of panels or sidewalls 178 would be considered to extend down from a ridge 163 into the plane of the drawing and terminate at groove 165. In this figure, the longer parallelogram sides are ridges 163 and grooves 165, and the shorter sides are height 183. Further, the relative locations of inflection points at linear valley 164 and primary valley 165B are noted in FIG. 11D. Intersections of panels 178 at points or peaks 163A in FIG. 11D appear as points and sharp as an example and not as a limitation. Peaks 163A are not sharp angles but are more generally rounded corners, as noted in FIG. 9, due to the manufacturing process, which smoother corners assist control of the movement of water or coolant across fill-sheet surfaces 151 or 153. Sharp corners along ridges 163 and at peaks 163A are also considered detrimental to the controlled flow of fluid on surfaces 151 or 153, as well as its retention on surfaces 151, 153.

In FIG. 11A, surface 151 has row or rank 167 of ridges 163 at panel top 279, which ridges 163 and associated grooves 165 are sloped to the right in the figure, and out of the plane of the drawing, to intersect a peak line 210. A second row 167 of ridges 163 and grooves 165 emanating from peak line 210 is similarly inclined or sloped to the right, but into the plane of the drawing, to intersect linear valley 164. A third row 167 of ridges 163 and grooves 165 proceeds to the right, and out of the plane of the drawing or planar surface 150, to intersect at a peak line 210. This cycle of three rows of ridges 163 and grooves 165 is an ordered array 158 of three cycles, which is considered to be a preferred embodiment. Other cyclical patterns may include a multiple of two cycles of ridges 163 and grooves 165, as shown in FIG. 11B. Further, tests have been performed with cycles of five rows of ridges 163 and grooves 165 being directed in a single direction. The election of the number of cycles or rows 167 of ridges 163 and grooves 165 in a single direction is left to the designer, but the number of cycles is preferably between 1 and 9 cycles. The number of cycles and spin angles 278 and 378 impact the movement of cooling water or coolant along the surface of obverse surface 151 or reverse surface 153 toward either water retention louvers 16 or mist eliminator 28. More particularly, in FIG. 11A, when angle 278 is greater in value than angle 378, the coolant fluid moving vertically downward in the figure is directed toward the edge with air inlet arrows 30. Similarly, when angle 378 is greater in value than angle 278, the coolant fluid will be directed toward the opposite or air discharge edge.

In FIG. 9, peaks or apices 163A of reverse surface 153 and obverse surface 151 are in close proximity with each other, but they are not in direct contact. Such contact would inhibit and disrupt the flow of cooling fluid on surfaces 151 and 153, as well as inhibiting air or gas contact with surfaces 151 and 153. The facing relationship in the as-assembled state of fill-pack 12 results in channels 220 and 222 being bounded between adjacent surfaces 151, 153 of adjacent A and B style fill-sheets. Channels 220 and 222 are physically similar, but ridges 163 and grooves 165 of vertically adjacent channels 220 and 222 are inclined in opposite directions.

FIG. 10 illustrates a channel 22u with a clockwise direction of gas flow therein. The solid lines inclined from peak line 210 and linear valley 164 illustrate ridges 163 and grooves 165 on obverse surface 151, while the dashed lines represent ridges 163 and grooves 165 on reverse surface 153. These sets of ridges 163 and grooves 165 on the facing surfaces 151 and 153 of the illustrated channel are oppositely inclined to linear valley 164 and peak line 210. Similarly, channel 222 in FIG. 9 has a counterclockwise direction gas flow with ridges 163 and grooves 165 of obverse surface 151 inclined in an opposite direction from those on the illustration of FIG. 10.

Air inlet side or edge 24 in FIG. 11B has arrows 30 indicating an inlet air-flow, or gas-flow, direction, which air flow direction 30 is also noted in FIGS. 1A and 11A. Air-flow direction 30 in FIG. 9 is considered to be into the plane of the paper. Channel 220 in FIG. 9 has clockwise directed arrow 224 indicating the spiral air motion in channel 220, and channel 222 includes counterclockwise direction arrow 226. Similar arrows are noted in the remaining alternating channels 220 and 222 in FIG. 9. Arrows 224 and 226 are indicative of the airflow pattern stimulated between the adjacent surfaces 151, 153 of fill-sheets 14 or, 50,52 and 58,60. The airflow pattern 224 or 226 may be considered to be a vortex or spiral processing along channel 220 or 222 from air inlet side 24 to air exit side 28 as shown in FIG. 1A. The spiraling air pattern is generally considered to be induced by the direction of the rows of ridges 163, peaks 163A, linear valleys 164 and grooves 165, which direction of facing rows 167 forming channels 220 and 222 on adjacent A and B sheets 50,52 and 58,60 is the same. The air spiraling in a channel 220 or 222 results in greater contact between the coolant fluid and the air, which provides improved heat transfer between the two media In addition, spiraling air has a lower pressure drop from air inlet side 24 to air exit side 28 across fill-pack 12. FIG. 10 illustrates a longitudinal view along a channel 220 with the clockwise spiraling airflow 30 depicted as a sinusoidal curve. However, this linear depiction is a planar view. An illustrative analogy for consideration would be envisioning channel 220 with a vee-shaped groove provided by linear valley 164 between lines 210 of apexes 163A. As an image, a coiled telephone cord could be stretched along valley 164 to visually project a spiral airflow pattern. This is only to provide a visualization aid to assist in the perception of a spiral of air flowing through a channel, and is not a limitation.

In FIG. 9, channels 220 and 222 are cross-sectional views of the channel lengths. Each of these channels has a first cross-sectional area generally between the lines noted as ridges 163 and a second cross-sectional area generally halfway between ridges 163 and grooves 165 of adjacent fill-sheets. The first cross-sectional area is considered to be the net area of the channel 220 or 222, and the second cross-sectional area is considered to be the gross cross-sectional area The ratio of the net area to the gross area of the channels in the preferred embodiment is about 0.76, but the desired spiraling effect is expected to be operative over at least a range of ratios between about 0.4 to 0.9.

The desired spiraling air pattern is produced in an open cell or channel 220 or 222, which channels are generally outlined by the position of peak lines 210 and linear valleys 164. It has been found that if the adjacent sheet surfaces 151 and 153 are too close to each other, then surfaces 151 and 153 do not generate as active a spiraling air pattern as desired. Alternatively, if surfaces 151 and 153 have too great a separation gap 202, it can be an inhibition to maintaining vortices 224, 226 within respective channels or passageways 220 or 222. In FIG. 9 as a specific example, peaks 163A on surfaces 151 and 153 of fill-sheet 50,52 are separated by profile depth 200 with a peak-to-peak value of 0.525 inch. However, separation gap 202 between proximate peaks 163A of adjacent fill-sheet surfaces 151 and 153 is only 0.225 inch. The sum of profile depth 200 and gap dimension 202 provides spacing dimension 281 of 0.750 inch. As noted above, if adjacent sheet surfaces 151 and 153 are too close to each other, then the surface or surfaces are not as active as desired. Therefore, the desired ratio between separation gap 202 and profile depth 200 is about 0.43, although the structure is operable over a range of ratios between 0.04 and 0.9. The above-noted operating parameters provide measures of fill-sheet characteristics for fill sheets 50,52, 58,60 or 14 for film-pack 12.

In particular, fill-sheets 14 or, 50,52 and 58,60 are produced with edges 24 and 26 parallel to vertical or longitudinal axis 80, but top edge 128 and bottom edge 130 are inclined at angle 89, which is preferably about 4.8° but may vary between about 0.0° and 10.0°. At assembly in illustrated crossflow cooling tower 10, fill-sheets 14 or, 50,52 and 58,60 will assume a position with top edge 128 and bottom edge 130 approximately parallel to horizontal axis 126. The fill-sheet length can be nominated merely by specifying a particular number of panels 54 or 56 in a single length of a fill-sheet. Individual panels 54,56 are preferably about two feet in length, which permits fill-sheet lengths of an even length to be provided by a combination of multiple panels 54, 56.

Mist eliminator 28 on mold 122 and fill-sheet 14 is shown in a cross-sectional view in FIG. 6A. Eliminator 28 has a generally bell-shaped curve form protruding above planar surface 150 with sloped sidewalls 170, peak 172 and reinforcing rib 174, which rib 174 is in proximity to and extends along outer edge 26 between fill-sheet bottom 130 and top 128. As shown in FIGS. 6B and 6C, mist eliminator 28 has a plurality of double-sided s-shaped louvers 176 extending at an acute angle from side edge 26 across the width 180 of eliminator 28. Louvers 176, have sloped sidewalls 170 and peaks 172 forming a ridge or second chevron 182 on eliminator bottom face 173 with a similar deformation forming peak 172. Peaks 172, 182 and sidewalls 170 of louvers 176 minimize water mist discharge from tower 10 and redirect moisture to fill-sheet surface 151. Louvers 176 also help to redirect or angle the exiting air toward fan 18 in FIG. 1A. The acute angle of each chevron-shaped slot 176 provides outer end 186 at outer edge 26 of each louver 176 vertically displaced above inner end 188 of the adjacent ridge on each face 151, 153, as shown in FIG. 6B, which inhibits outward water discharge and enhances water return flow to fill surface 151. Louver 176 on top or obverse face 151 can be considered to be the back face of bottom-face louver-peak 182. Similarly, bottom-faced slot 184 is the back face or surface of top-face louver 176. Louvers 176 in this preferred embodiment occur with a separation distance of about three inches. Between louvers 176 on fill obverse 16 surface 151 and reverse face 183 of mist eliminator 28 are a plurality of microgrooves 185, as noted in FIGS. 6B and 6D. Microgrooves 185 have a peak-to-peak groove height 187, which is about forty thousandths in height. Microgrooves 185 also have inner edges 189 vertically below outer edges 191, and similarly act like louvers 176 to redirect water to fill-sheet surface 151.

Water-retention louvers 16 of fill-sheet 14, and as outlined in mold 122 in FIG. 4B, are noted in cross-sectional view in FIG. 4C with louver peaks 190 and louver valleys 192 between peaks 190 on fill-sheet top or obverse face 151. The formed material displacement for water-retention louver 16 results in a generally equivalent image of top face 151 on fill-sheet bottom or reverse face 153 for provision of the same illustrative retention-louver pattern. The individual chevrons of this louver pattern have outer endpoints 193 of peaks 190 and valleys 192 in proximity to side edge 24 and vertically displaced above inner end point 195 of lower adjacent chevron peak 190 or valley 192. This vertical end point displacement inhibits water transfer from film pack 12 at outer edge 24, and directs tramp water downward to fill-sheet obverse surface 151. Ridges or peaks 190 of a louver section on an obverse surface 151 are in contact with ridges 190 of a louver section on an adjacent fill-sheet reverse surface 153, thereby inhibiting water discharge between adjacent fill-sheets 14. In the specific example noted above for the separation gap 202 and profile depth 200, ridges 190 of water retention louver 16 would have a profile depth of three-quarter inch.

In FIG. 11C, a partial oblique perspective view of obverse surface 151 of a fill-sheet 14, 50 or 58 is noted along with as-formed passage 70 or 72, and louvers 16 at side edge 24. More specifically, this panel is a three-cycle panel with a top edge 128 sheared along parting line 152, which would provide an A-section panel 54, as shown in FIG. 3A. FIG. 11C particularly provides an illustration of the previously noted discontinuities generally occurring in the repetitive pattern of fill-sheets 14 or 50,52 and 58,60. The discontinuities include parting lines 152 and 154, ports or passages 70 or 72, and vertical aisle 250 on surface 151, which aisle 250 is parallel to major axis 82 and side edge 24.

Figure 20:
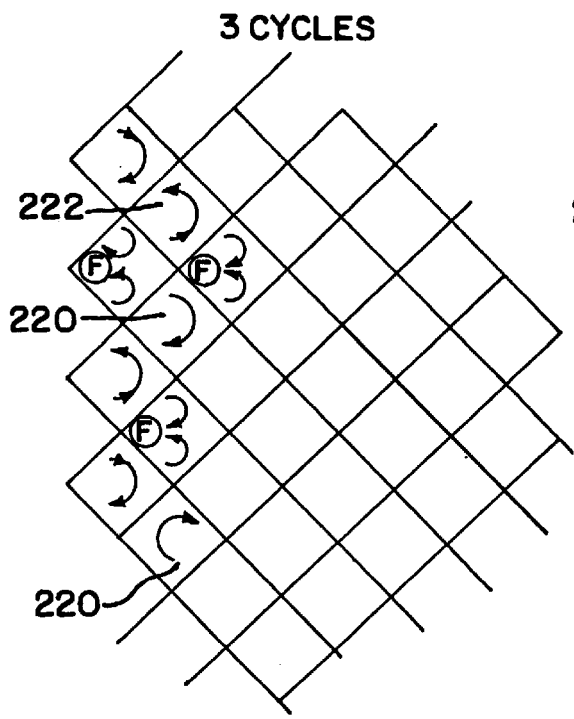
FIG. 20 is an alternative illustration of the air-flow in the channels of fill-sheets as in FIG. 9 with channel-pattern disruption.
Figure 21:
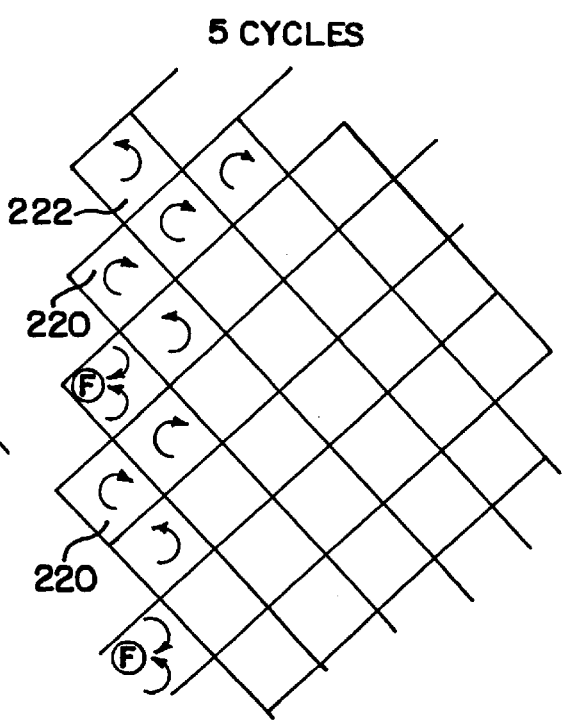
FIG. 21 is another alternative illustration of the air-flow in the channels of fill sheets as in FIG. 9 with an alternate channel pattern disruption.

The reversal of the enhancement pattern can create a double vortex 224 and 226 of air flow vortices in opposite directions within a channel 220 or 222. Double vortices are noted in three of channels 220 or 222 in FIG. 9. However, the impact of these reversals on the panels and the relation to the chevron-like pattern is shown in plan view in FIGS. 20 and 21, where there is a continuous diamond grid layout noting the alternate pitch-cycle frequencies of three cycles and five cycles noted, respectively. Channels 220 or 222 with the double-vortices are noted with the letter F indicating a double vortex channel in FIGS. 20 and 21. In the smaller pitch cycle of FIG. 20, a greater occurrence of the double vortex phenomena has been noted.

Aisle 250, which is in the plane of the unformed plastic sheet and neutral axis 160 in FIG. 11C, extends between top edge 128 and bottom edge 130 of each panel 54, 56 or fill-sheet 14, 50 or 58. Male separators 252 extend above obverse face 151 a height 253 and are positioned along aisle 250 at a preset separation distance 255 from female separator 254; as shown in FIGS. 11C and 11E. Female separators 254 also extend above obverse surface 151 of aisle 250 a short height 257, relative to separator height 253. Adjacent male separators 252 and adjacent female separators 254 at upper edge 128 in FIG. 11C are noted as closely arranged with duplicate female separators 254 between adjacent male separators 252 to accommodate alternative positions for A and B sheet structures. Both male separators 252 and female separators 254 are hollow, and thus they provide cavities open at reverse face 153 of fill-sheets 14. As shown in FIG. 11E, male separators 252 have first cavities 259, which male separators 252 have a generally conical shape with an elliptical base to maintain an upright position. Female separators 254 have generally conical shape with a first guide section 267 and a second cavity 261 to receive upper end 263 of a mating male separator 252 at final assembly of film-pack 12.

Mating of male separators 252 with female separators 254 at final assembly is readily accomplished as separation distance 255 between adjacent male separators 252 and adjacent female separators 254 is equal to the separation distance 96 between the foci 90 and 92 of passage 70 in FIG. 14. This equivalence puts male separators 252, and more particularly upper end 263 extending from obverse surface 151 of a first fill-sheet 14, in register with second cavities 261 of female separators 254 on reverse surface 153 of an adjacent fill-sheet.

During shipping and storage, fill-sheets 14 or 50,52 and 58,60 may be nested as illustrated in FIG. 16 with separators 252 mating with first cavities 259 of separators on an adjacent fill-sheet. This nested configuration allows the ridges 163 to mate with facing linear valleys to decrease the volume of film packs 12 by as much as a 20 to 1 ratio, which conserves space for storage, shipping and handling. The small offset or separation gap 255, which in the example above is about one and one-half inches, permits the adjacent sheet male separators 252 to mate with a cavity 259 on an adjacent fill-sheet 14 at facing reverse surface 153. Historically, this nesting has typically required at least the length of an as-produced panel when the fill-sheet structure of a fill-pack 12 was prepackaged. In the present illustration, fill-sheet nesting can be accommodated by the extension of alternating sheets about one and one-half inches in a forty-eight inch fill-sheet segment. It is recognized that the length of a fill-sheet 14 may be greater than the as-produced segment, since these segments may be provided on a continuous sheet of raw material. Therefore, the incremental portion required may be about 3.1 percent of the as-produced segment noted for the example, but in any case will be less than one-third of the as-produced, single formed segment utilized to provide fill-sheet 14. Production of multiple segments to provide fill-sheets 14 of varying lengths will be described below. In addition, this tightly nested configuration of a multiplicity of fill-sheets 14 provides a substantially stronger laminated type structure to enhance handling, which lamination may be considered as an analogy to plywood.

At assembly of film-pack 12, male separators 252 and female separators 254 are displaced from their storage positions relative to adjacent fill-sheet surfaces 151 and 153 to mate male separators 252 with female separators 254 of reverse surfaces 153. At their mated positions, separators 252 adequately extend above obverse surface 151 to accommodate the gap separation distance 202 between facing peaks 163A on surfaces 151 and 153. This position provides a mechanical separation to assure maintenance of gap 202 between adjacent fill-sheets 14 and positive alignment of adjacent fill-sheets 14 within fill-pack 12.

Fill sheets 14 or 50,52 and 58,60, as shown in FIGS. 3A to 3E, have an enhancement pattern on their respective obverse surfaces 151 and reverse surfaces 153. These surface patterns on the facing surfaces of adjacent A and B style fill-sheets 14 are generally mirror images of each other, which mirror-image structure at final assembly provides channels 220 and 222. In the preferred embodiment, each sheet surface 151, 153 has a distance between adjacent peaks 163A in a line 210, which is noted as pitch 265 in FIG. 11A. The vertical cycle for the enhancement pattern in FIG. 11A has a repetitive cycle of three rows 167 of ridges 163 inclined in the same angular direction from horizontal axis 126. In a specific embodiment, the enhancement pattern moves the coolant water along sheet surface 151 or 153, and in this preferred embodiment the water moves horizontally along sheet surface 151 or 153 one and one-half pitches 265, per one vertical cycle or two vertical rows 167. The travel-to-pitch ratio is generally preferred to be any of the half-cycle ratios, such 0.5, 1.5, 2.5 and so forth. Similarly, enhanced flow is provided for any of the travel-to-pitch ratios not a whole number.

Fill-sheets, or heat and mass transfer media, 14 are frequently formed from a plastic material, such as a continuously fed sheet of polyvinylchloride, or PVC, by thermoforming processes as known in the art. The choice of material for fill-sheets 14 is a design choice, and the example of PVC is not a limitation. Alternative examples of materials include stainless steels for high-temperature applications, such as catalytic converters. In FIG. 4A, mold 120 is operable to form similar fill-sheets 52 and 60, which are noted in FIGS. 3B and 3D, respectively. Mold 120 has parting lines 124 to provide the aligned width of sheets 14 and side edges 26, which lines note a location for slitting or shearing. Similar molds with alternative sheet outlines may be provided to produce sheet outlines with louvers 16 and side edge 24 as noted in FIG. 4B, although only a single but larger panel is illustrated. The specific width and length of any of panels 54 and 56, as well as the single panel outline of fill-sheets 14 in FIG. 3E, are available to the designer, but the illustrations of molds 120 and 122 are merely exemplary and not a limitation to the available mold alternatives and arrangements. The length of any fill-sheet 14 may be provided by noting a continuously united plurality of panels 54 and 56.

Molds 120 and 122 are shown with side edges 24 and 26 parallel to vertical axis 80, however, horizontal axis 126 is displaced from panel top edge 128 and panel bottom edge 130 by angle 89, which is equal to angle 88 noted in FIGS. 3A and 3B. Manufacture of fill-sheets 14 provides major axis 82 of elliptical passages 70, 72 parallel to side edges 24 and 26. In FIGS. 4A and 4B, molds 120 and 122 are arranged with side edges 24 and 26 parallel to mold vertical or longitudinal axis 81 for illustration of an exemplary manufacturing process and not as a limitation. In the mold configuration of FIGS. 4A, edge 27 is parallel to side edge 26, which edge 27 will usually be abutted to a second fill-sheet 50 or 58 to provide a fill-sheet 14 of a desired width. Fill-sheets 52 or 60 may be utilized independently of an abutting sheet. The specific sheet arrangement is considered a design choice, that is a side-by-side fill-sheet, a one-piece fill-sheet, fill-sheets with or without louvers and mist eliminators, or combinations of such arrangements.

As noted above, fill-sheets 14 may be formed from a sheet of formable plastic, which can be either discrete sheets or a continuously fed sheet from a roll of plastic sheet, for example. The unformed plastic sheet is a generally planar sheet 150 with an obverse surface 151 and a reverse surface 153. The finished or formed plastic sheet has shear lines 152 and 154 on each of panels 54, 56 of fill-sheets 14. Shear lines 152 and 154 appear in the figures as parallel double lines with a gap 149 between them to define a linear position for shearing or separation. The shear lines 152, 154 are noted on fill sheets 50,52, 58 and 60 in FIGS. 3A to 3D. Upper shear line 152 in FIGS. 4A and 4B is also operable as a seal line for molds 120, 122 during manufacturing. In a specific example, shear lines 152 and 154 are about three-eighth inch in width.

The structure of fill-sheets 14 or 50,52 and 58,60 is broadly provided by a thermoforming process. However, molds 120 and 122 uniquely provide a two-panel arrangement, which panels are about twenty-four inches in length thus providing a single fill-sheet of forty-eight inches in length at any single pressing. Although the sheets are provided in increments of forty-eight inches, which is the result of the two-panel arrangement, each panel 54,56 merely requires a one and one-half inch offset. More specifically, as noted above fill-sheets 14 or 50,52 and 58,60 are produced in an A and a B sequence, and historically this has required separate molds, or different configurations within the same mold, for each style of sheet. The formed sheets were then sheared at either the A or B parting line 152, 154, which were about 24 inches apart, thus producing different fill-sheets on separate stacks or pallets. If both sheets were nested on top of one another, the nested bundle would protrude from the body of the film-pack 12 approximately one-half index, or twenty-four inches, in the present case. This pre-shipping assembly operation is cumbersome and results in awkward shipping and packaging problems. Alternatively, on-site assembly of alternating fill-sheets is considered to be inefficient and requires maintaining an assembly operation remote from the production site, which is considered to be unacceptable manufacturing practice due to loss of control and evaluation of the finished product.

Molds 120 and 122 are respectively utilized to provide fill-sheets 14 or 50,52 and 58,60. It is recognized that mold 120 does not illustrate inclusion of louver segment 16, and similarly that mold 122 does not illustrate the inclusion of mist eliminator 28, which elements may be provided by insertion of the proper mold segment to produce the desired configuration. The illustrated molds 120 and 122 were provided as examples of available structures, not limitations. Molds 120 and 122 are provided as assemblies of several inserts, which inserts provide the desired fill-sheet configurations, as noted in FIGS. 3A to 3E, and they can be added or removed as known in the art.

Figure 23:
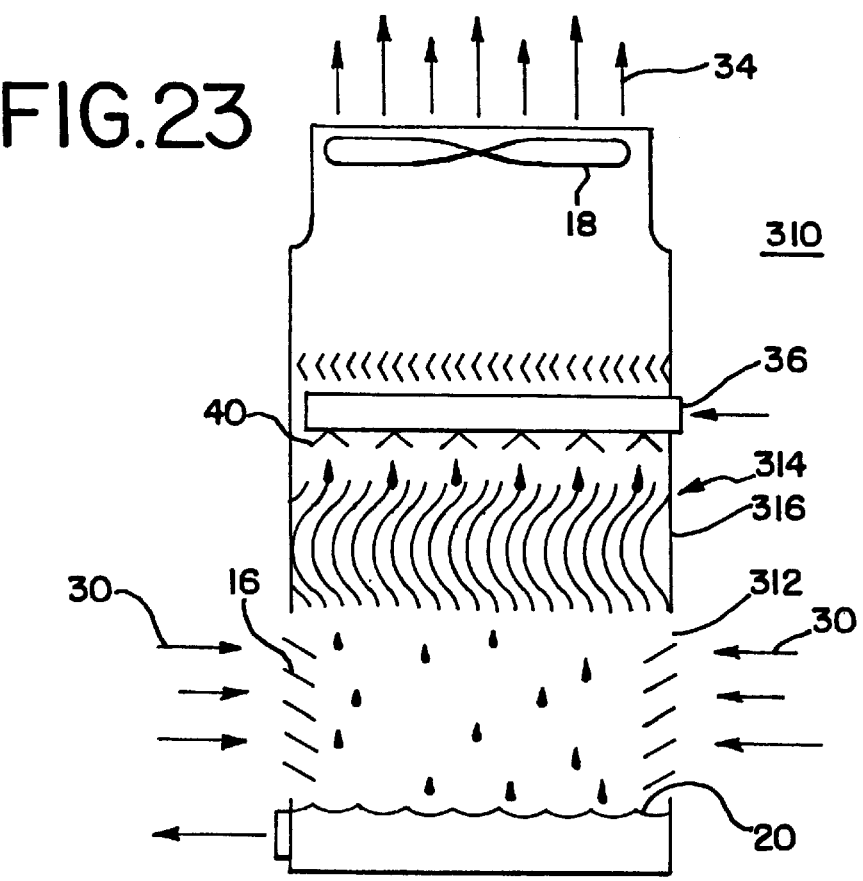
Figure 22:
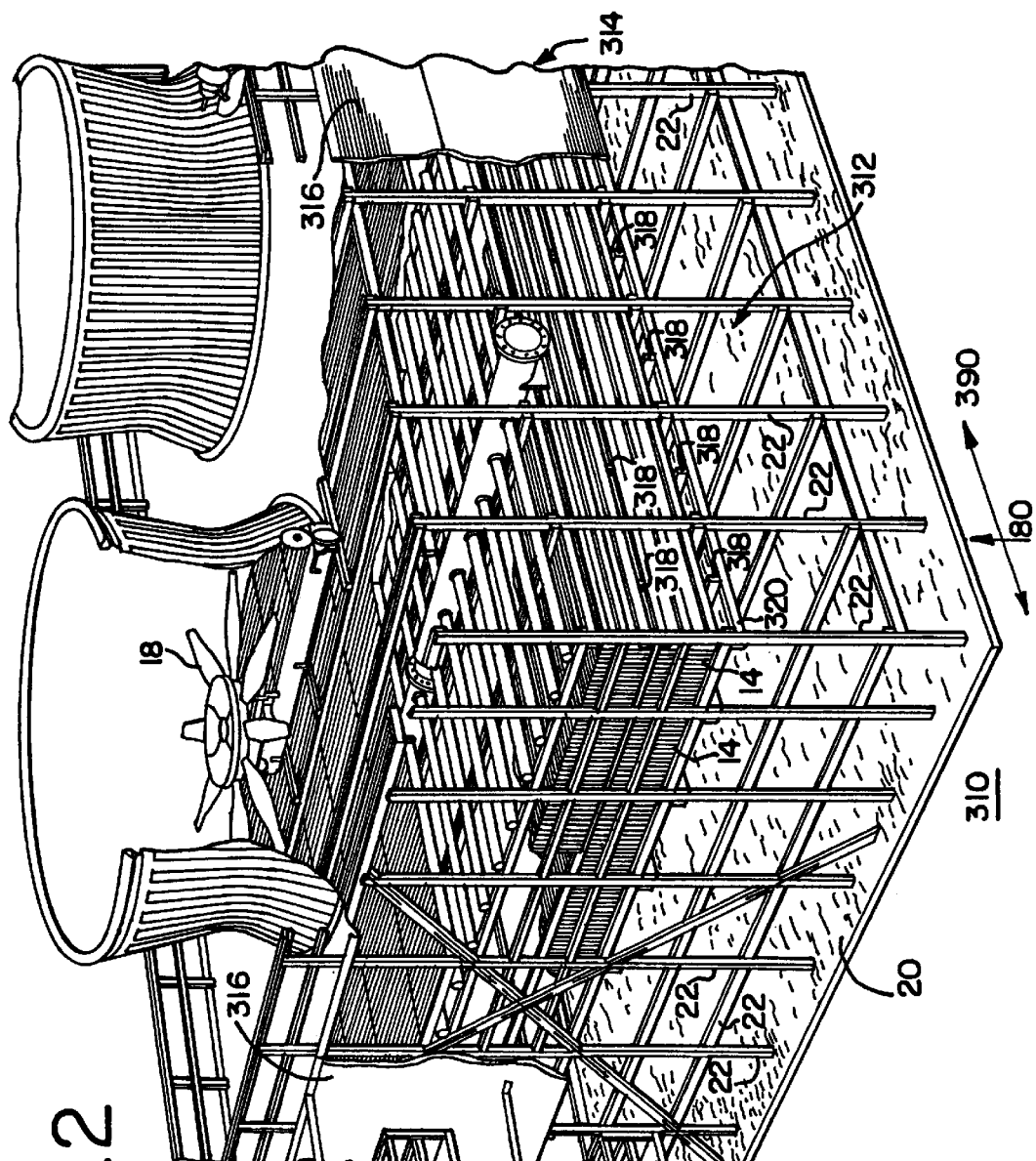
FIG. 22 is an enlarged, oblique, sectional view of the film fill-pack of a counterflow cooling tower; and, FIG. 23 is a diagrammatic cross-sectional view of a counterflow cooling tower as in FIG. 22.

In an alternative embodiment, fill-sheets 14, or 50,52 and 58,60 may be mounted in a counterflow cooling tower 310, which is noted in FIG. 22. The diagrammatic illustration of tower 310 in FIG. 23 shows the arrangement of the several components and sections of cooling tower 310 with sump 20, fan 18, conduit 36 and nozzles 40 generally noted in the same relationship as in tower 10 of FIG. 1A. In this configuration, tower 310 is generally open at lower section 312 with upper section 314 having sidewalls 316 and support members 318. Airflow 30 again is drawn in horizontally through open section 312 and past water-retention louvers 16. However, fill-sheets 14 are provided above or over sump 20 between sump 20 and fan 18. Water or fluid from nozzles 40 is directed onto fill-sheets 14, which has peak lines 210 and linear valleys 164 generally vertically arranged for communication of airflow through fill-sheets 14. In this illustration, FIG. 9 could be considered to represent a plan view of film fill-pack 12.

In this counterflow tower 310, fill-sheets 14 do not include integral water retention louvers 16 or mist eliminators 28 as edges 24 and 26 are not directly exposed to an ambient volume, but are constrained within closed upper section 314. Fill-sheets 14 in tower 310 of FIGS. 22 and 23 are arranged on either of edges 24 and 26 atop lateral support members 318, which support members 318 are transverse to vertical axis 80 or the longitudinal length of fill-sheets 14 in FIG. 3D. Support members 318 are maintained in position by ribs 320 coupled to tower structural members 22.

More particularly, fill-sheets 14 can be similarly produced on molds 120 by the insertion of mold inserts as described above. In a specific structure, it is considered that sheet width 324 in FIG. 3E is preferably between sixteen inches and twenty-four inches. In this nominal-width arrangement, fill-sheets 14 may be manufactured, packaged, shipped and assembled in a manner similar to the above-described and vertically suspended fill-sheets 14. However, fill-sheets 14 in this arrangement are positioned with one of edges 24 and 26 contacting lateral members 318 and the other edge vertically arranged in tower 310. Fill-sheets 14 in tower 310 have side edges 24 and 26 generally parallel to tower horizontal axis 390. In tower 310, the alternating A and B fill-sheet configuration is maintained as in the above-described vertical fill-sheet arrangement. The A and B fill-sheet alignment in the assembled structure is provided by any means known in the art including manual separation of individual fill-sheets after positioning a film-pack 12 in tower 310 on lateral members 318. It is apparent that relatively narrow fill-sheets 14 are capable of sustaining a short height fill-sheet, but maintenance of individual fill-sheets 14 in this on-edge arrangement is buttressed by the close proximity of fill-sheets 14 and the mating of male separators 252 with female separators 254 for increased mechanical support. Further, in this edge-supported fill-sheet arrangement, mounting rods 112 are not utilized, which avoids the necessity of piercing fill-sheets 14.

In this horizontal arrangement of FIGS. 22 and 23, fill-sheets 14 have vertically oriented peak lines 210, and the corresponding linear valleys 164 between peak lines 210 are similarly vertically directed. The horizontally assembled fill-sheets 14 again have peak lines 210 of adjacent reverse surface 153 and obverse surface 151 of adjacent fill-sheets 14 in close proximity and alignment to outline channels 220 and 222 in a vertical configuration for transfer of air flow or gas flow through fill-sheets 14. Ridges 163 and grooves 165 again cooperate with peaks 163A and linear valleys 164 to form spiraling vortices within the channels 220, 222 to enhance heat transfer between the flowing gasses and fluids.

In a further embodiment, lateral support members 318 can be provided in a crossflow cooling tower 10 to support vertically arranged fill-sheets 14. In such a configuration, support rods 112 may be obviated and the length or height of individual fill-sheets 14 may be varied to accommodate the requisite separation between vertically adjacent tower lateral support members 318.

While only specific embodiments of the invention have been described and shown, it is apparent that various alterations and modifications can be made therein. It is, therefore, the intention in the appended claims to cover all such modifications and alterations as may fall within the true scope of the invention.

We claim:

1. A fill-sheet for film fill-packs of heat transfer and mass transfer devices, said devices having means for transferring gas-flow and fluid through said fill-packs, each said fill-pack having at least two said fill-sheets, said fill sheets comprising:

each said fill-sheet having a reference plane, each said fill sheet having an obverse surface and a reverse surface, a plurality of ridges and grooves, each said ridge and groove having a first end and a second end, said plurality of ridges and grooves arranged in a plurality of ranks of said ridges and grooves, each said obverse surface and said reverse surface having a formed array with a repeating pattern of said ranks of ridges and grooves, each said rank having at least one apex above said reference plane and at least one valley below said reference plane, one of said first ends and second ends of each said ridge and groove terminating at an apex vertically above said reference plane on each said obverse and reverse surface, the other of said first ends and second ends of each said ridge and groove extending to at least said one valley below said reference plane, each said fill-sheet positionable in a fill-pack to provide said apices and said valleys of one of said obverse and reverse surfaces in substantial facing alignment with said apices and said valleys of an other of said obverse and reverse surfaces of an adjacent fill-sheet to define a plurality of channels between said adjacent fill-sheet obverse and reverse surfaces said facing ranks of aligned peaks separated by a separation gap.

2. A fill-sheet for film fill-packs of heat and mass transfer devices as claimed in claim 1 wherein said facing ranks of aligned peaks are separated by a separation gap, said separation gap about 0.225 inch.

3. A fill-sheet for film fill-packs of heat and mass transfer devices as claimed in claim 1 wherein said heat transfer and mass transfer devices have means for supporting said film fill-packs.

4. A fill-sheet for film fill-packs of heat and mass transfer devices as claimed in claim 3 wherein said means for supporting has a plurality of lateral members;

said heat and mass transfer devices having a housing, said lateral members mounted in said housing, said film fill-packs positioned on said lateral members to provide said channels in one of a horizontal arrangement and a vertical arrangement of said channels.

5. A fill-sheet for film fill-packs as claimed in claim 1 wherein each said fill-sheet has a first side-edge and a second side edge, said ranks of said ridges and grooves generally extending between said first and second edge, each said obverse and reverse surface of each said rank having at least one discontinuity defining at least one offset from said ranks between said first edge and said second edge on each said surface, said offset defining at least one second discontinuity in said channels between said first edge and second edge, said second discontinuity in a channel angularly diverting at least some of said gas-flow in said channel at said discontinuity with said facing ranks of said aligned peaks separated by a separation gap.

6. A fill-sheet for film fill-packs of heat and mass transfer devices as claimed in claim 3 wherein each said fill-sheet has a top edge, a bottom edge, a first side edge, a second side edge, a transverse axis, a longitudinal axis and at least one mounting-passage impression with a first outline having a first and major axis with a first length, a second outline defined on said first outline and having a central position on said major axis, said first outline having a central position on said major axis displaced from said second-outline central position, said first and major axis generally parallel to one of said longitudinal and transverse axes and extending through said first outline central position and said second outline central position, at least one second and minor axis with a second length shorter than said first length, a second minor axis extending through at least one of said first outline and second outline central positions;

one of said first and second mounting-passage outlines defining a first aperture, the other of said first and second mounting-passage outlines defining a second aperture, one of said first and second apertures provided on each said fill-sheet in said fill-pack;

said fill-pack having at least two adjacent fill-sheets, at least one of said fill-sheets with said first aperture and the other of said at least two adjacent fill-sheets having said second aperture provided in said fill-pack, said means for supporting extending through said first aperture and said second aperture of said adjacent fill-sheets for at least one of arranging and supporting of said fill-sheets in an ordered arrangement of said fill-pack.

7. A fill-sheet for film fill-packs of heat and mass transfer devices as claimed in claim 4 wherein said supporting means further comprises a plurality of lateral members;

each said fill-sheet having a top edge, a bottom edge, a first side-edge, a longitudinal axis and a transverse axis;

said heat transfer and mass transfer devices have housings, said housing for each device having a vertical axis and a horizontal axis, said lateral members mounted in said housing, said fill-packs positioned on said lateral members on one of said edges to arrange said channels in general alignment with one of said vertical and horizontal axes.

8. A fill-sheet for film fill-packs of heat transfer and mass transfer devices as claimed in claim 6, wherein said first-outline central position and said second-outline central position are separated by an interval, one of said first aperture fill-sheets and second aperture fill-sheets displaced along said major axis on said means for supporting extending through said first and second apertures to provide said displaced fill-sheet apices and valleys on said obverse and reverse surfaces in substantial alignment with the other of said first-aperture and second-aperture fill-sheet obverse and reverse surface apices and valleys of adjacent fill-sheets in said film fill-pack.

9. A fill-sheet for film fill-packs of heat transfer and mass transfer devices as claimed in claim 8 wherein said first outline is a generally elongate shape and said second outline is circular;

each said mounting-passage impression is provided on one of said obverse and reverse surfaces, each said mounting-passage first and second outlines having a perimeter, an upstanding rib provided on each said first and second outline perimeter, said rib extending generally normal to said one fill-sheet surface and providing strength and rigidity to said fill-sheet on said supporting means at said first and second apertures.

10. A fill-sheet for film fill-packs of heat and mass transfer devices as claimed in claim 1 and further comprising means for separating each said fill-sheet from adjacent fill-sheets in a fill-pack.

11. A fill-sheet for film fill-packs of heat transfer and mass transfer devices as claimed in claim 10 wherein said means for separating has a plurality of male separators and female separators, each said male and female separator positioned on one of said obverse surface and reverse surface of each said fill-sheet, each said female separator being hollow and open on the other of said obverse and reverse surfaces, said male separator protruding above said one of said obverse and reverse surfaces at a first height, said female separator protruding above said one of said obverse and reverse surfaces at a second height shorter than said first height, said male separator of a first fill-sheet one surface matable with said female separator of another surface of an adjacent fill-sheet in said film-pack in said heat and mass transfer devices to maintain said fill-sheet surfaces at a desired position within said film fill-pack and said heat transfer and mass transfer devices.

12. A fill-sheet for film fill-packs of heat transfer and mass transfer devices as claimed in claim 1 wherein said fill-pack has a plurality of said fill-sheets, each said fill-sheet having a top edge and a bottom edge cooperating to form a first pair of edges, each said fill-sheet having a first side edge and a second side edge cooperating to form a second pair of edges, said fill-pack in said device having a horizontal axis and a vertical axis normal to said horizontal axis, one of said first pair of edges and said second pair of edges generally parallel to said horizontal axis in said fill-pack, and said other pair of edges displaced from said vertical axis at an angle between about 0.0° and 10.0°.

13. A fill-sheet for film fill-packs of heat transfer and mass transfer devices as claimed in claim 1 wherein said heat transfer and mass transfer device is a crossflow cooling tower.

14. A fill-sheet for film fill-packs of heat transfer and mass transfer devices as claimed in claim 1 wherein said heat transfer and mass transfer device is a counterflow cooling tower.

15. A fill-sheet for film fill-packs of heat transfer and mass transfer devices as claimed in claim 1 where each said fill-sheet has a top edge, a bottom edge, a fist side edge, a second side edge, a transverse axis and a longitudinal axis, said top edge and bottom edge generally parallel and cooperating to define a first pair of edges, said first side edge and said second side edge generally parallel and cooperating to define a second pair of edges, said heat transfer and mass transfer devices having housings, said housing for each said device having a vertical axis and a horizontal axis, said channels between adjacent fill-sheets generally parallel to said housing horizontal axis and about normal to one of said first pair and second pair of edges, said one pair of edges generally perpendicular to said gas-flow, each said fill-sheet having gas-flow entry at one of said edges of said one pair of perpendicular edges, and a gas discharge at the other of said gas-flow perpendicular edges, each said fill-sheet having a mist eliminator, said mist eliminator extending between the other pair of said edges, said mist eliminator mounted on said fill-sheet at said gas-flow discharge edge to inhibit transfer of entrained fluid transfer from said film-pack and said heat transfer and mass transfer device.

16. A fill-sheet for film fill-packs of heat transfer and mass transfer devices as claimed in claim 1 wherein each said fill-sheet has a top edge, a bottom edge, a first side edge, a second side edge, a transverse axis and a longitudinal axis, said top edge and bottom edge generally parallel and cooperating to define a first pair of edges, said first side edge and said second side edge generally parallel and cooperating to define a second pair of edges, said heat transfer and mass transfer devices having housings, said housing for each said device having a vertical axis and a horizontal axis, said channels between adjacent fill-sheets generally parallel to said housing horizontal axis and about normal to one of said first pair and second pair of edges, said one pair of edges generally perpendicular to said gas-flow, each said fill-sheet having gas-flow entry at one of said edges of said one pair of perpendicular edges, and a gas discharge at the other of said gas-flow perpendicular edges, a plurality of water retention louvers, each said fill-sheet having a row of water retention louver blades provided at said gas-flow entry edge, said row of water retention louver blades extending between said other pair of said edges and operable to inhibit water transfer from said cooling tower along said gas-flow entry edge.

17. A fill-sheet for film fill-packs of heat transfer and mass transfer devices as claimed in claim 16 wherein each said fill-sheet further comprises a mist eliminator at said discharge edge for inhibition of entrained water transfer from said fill-pack.

18. A fill-sheet for film fill-packs of heat transfer and mass transfer devices as claimed in claim 16 wherein each said water retention louver on each said fill-sheet has an upper surface and a lower surface generally in planar alignment with said fill-sheet obverse surface and reverse surface, respectively, each said louver having an inner end in proximity to said channels and an outer end in proximity to said gas-flow entry edge,
 each said louver on any of said upper and lower surface having a raised surface with a first groove vertically above said raised surface and a second groove vertically below said raised surface, said raised surface parallel to said lower groove and upper groove,
 each said louver outer end vertically above said louver inner end of a vertically upward adjacent louver inner end to inhibit transfer of fluid from said heat transfer and mass transfer devices.

19. A fill-sheet for film fill-packs of heat transfer and mass transfer devices as claimed in claim 18 wherein said raised surface on one of said upper and lower surfaces conforms to one of said first groove and said second groove of the other of said upper and lower surfaces.

20. A fill-sheet for film fill-packs of heat transfer and mass transfer devices as claimed in claim 1 wherein said ranks of said ridges and grooves of said formed array on a cross-section to said reference plane are at a predetermined angle on both said obverse and reverse surfaces.

21. A fill-sheet for film fill-packs of heat transfer and mass transfer devices as claimed in claim 20 wherein said predetermined angle is between about 20° and 60°.

22. A fill-sheet for film fill-packs of heat transfer and mass transfer devices as claimed in claim 1 wherein said ridges in each said rank are generally aligned in parallel, one of said grooves provided between adjacent ridges in said ranks, a plurality of planar surfaces on said array, a planar surface extending between each said ridge and adjacent grooves,
 each said groove having an axis normal to said groove,
 said planar surfaces extending from each said groove to said adjacent ridges on said array being displaced at an enhancement angle from said normal axis, said enhancement angles between each said planar surface and said normal axis being equal and cooperating to provide an enhancement angle for said array.

23. A fill-sheet for film fill-packs of heat transfer and mass transfer devices as claimed in claim 1 wherein said ridges in each said rank are generally aligned in parallel, one of said grooves provided between adjacent ridges in said ranks, a plurality of planar surfaces on said array, a planar surface extending between each said ridge and adjacent grooves,
 said adjacent ridges having a first adjacent ridge and a second adjacent ridge,
 each said groove having a vertical axis normal to said groove,
 said planar surfaces extending from each said groove to said first adjacent ridge on said array displaced at a first enhancement angle from said vertical axis, said planar surface extending from said groove to said second adjacent ridge displaced at a second enhancement angle to said vertical axis, said first and second enhancement angles cooperating to provide an enhancement angle for said array, one of said first and second angles greater than the other of said first and second enhancement angles to bias said enhancement angle of said array.

24. A fill-sheet for film fill-packs of heat transfer and mass transfer devices as claimed in claim 22 wherein said array enhancement angle between adjacent planar surfaces of a groove is between about 75° and 145°.

25. A fill-sheet for film fill-packs of heat transfer and mass transfer devices as claimed in claim 1 wherein said apices defining each said channel are adjacent, said adjacent apices and the valley therebetween of each said obverse and reverse surface cooperate with one of an adjacent fill-sheet obverse and reverse surface set of adjacent apices and valley to define a channel,
 said apices defining said channel cooperating to define a first planar surface with a first and net cross-sectional area of said channel,
 said valleys defining said channel cooperating to define a second planar surface with a second and gross cross-sectional area of said channel,
 said first and second cross-sectional areas cooperating to define a ratio of net area to gross area between about 0.40 and 0.90 to provide said spiraling of said gas flow through said channels.

26. A fill-sheet for film fill-packs of heat transfer and mass transfer devices as claimed in claim 1 wherein said fill-sheet surfaces have a plan view, each said fill-sheet having a top edge, a bottom edge, a first side edge and a second side edge, a reference axis extending between one of said first side edge and second side edge, and between said top edge and said bottom edge, said ridges and grooves inclined from said reference axis in either of a clockwise direction at a first acute angle and a counterclockwise direction at a second acute angle from said apices of said rank in said plan view to define spin angles providing a controlled spin on said gas flow for spiraling through each said channel.

27. A fill-sheet for film fill-packs of heat transfer and mass transfer devices as claimed in claim 26 wherein said spin angles are between 25° and 75°.

28. A fill-sheet for film fill-packs of heat transfer and mass transfer devices as claimed in claim 1 wherein said apices of one of an obverse and reverse surface of a first fill-sheet in proximity to a respective reverse and obverse surface of a second and adjacent fill-sheet cooperate to define a separation gap between said apices, each said fill-sheet defining a profile depth between said obverse surface apices and said reverse surface apices,
 said profile depth and said separation gap cooperating to define a spacing dimension between adjacent fill-sheets,
 said separation gap and said profile depth cooperating to define a ratio between about 0.04 and 0.9.

29. A spacing arrangement for heat transfer devices and mass transfer devices having film fill-packs, said fill-packs having at least two adjacent fill-sheets and means for arranging said fill-sheets, each said fill-sheet having a first side edge, a second side edge, a top edge, a bottom edge, a longitudinal axis, and a transverse axis, said spacing arrangement comprising:
 each said fill-sheet having an obverse surface and a reverse surface, said adjacent fill-sheets initially provided at a nested position and shiftable between said nested position and an operational position in said heat and mass transfer devices;

means for separating on each said fill-sheet;

said means for separating positioned on one of said obverse and reverse surfaces, said means for separating on adjacent fill-sheets matable at said nested position, said separating means operable to define a predetermined offset gap between adjacent fill-sheets at said operational position after an offset shift of said fill-sheets on said means for arranging, said offset gap is between about one-half inch and twelve inches.

30. A spacing arrangement for heat transfer devices and mass transfer devices having film fill-packs as claimed in claim 29 wherein said heat transfer and mass transfer devices have a horizontal axis, each said fill-sheet having a longitudinal axis, a horizontal axis, a top edge, a bottom edge, a first side edge and a second side edge, said fill-sheet mounted in said heat transfer and mass transfer devices in said nested position, each said fill-sheet in said heat transfer and mass transfer devices and one of said longitudinal axis and transverse axis generally parallel to said horizontal axis.

31. A spacing arrangement for heat transfer devices and mass transfer devices having film fill-packs as claimed in claim 29 wherein said heat transfer and mass transfer devices have a horizontal axis, a longitudinal axis and a transverse axis, each said fill-sheet having a top edge, a bottom edge, a first side edge and a second side edge, said fill-sheets mounted in said heat transfer and mass transfer devices and shiftable by said offset gap to said operational position, each said fill-sheet in said heat transfer and mass transfer devices having one of said longitudinal axis and transverse axis generally parallel to said horizontal axis.

32. A spacing arrangement for heat transfer and mass transfer devices having film fill-packs as claimed in claim 29 wherein said means for separating has a plurality of male separators and a plurality of female separators, said male separators positioned on one of said obverse and reverse surfaces, said female separators positioned on one of said obverse and reverse surfaces, said male separators and female separators on adjacent fill-sheets matable at said nested position and cooperating to define a predetermined offset gap between one of adjacent male separators and female separators on a fill-sheet obverse and reverse surface, said male separators and female separators on each said fill-sheet obverse and reverse surfaces matable with said male separators and female separators, respectively, of an adjacent fill-sheet at a nested position, said adjacent fill-sheets translatable between a nested position and an operational position, said adjacent fill-sheets translatable at said operational position to provide said male separators and female separators of said one fill-sheet obverse and reverse surface in alignment with said respective female separators and male separators on the other of said obverse and reverse surfaces of an adjacent one of said fill-sheets.

33. A spacing arrangement for heat transfer and mass transfer devices having film-fill-packs as claimed in claim 29 wherein said means for separating has a plurality of male separators extending above one of said obverse and reverse surfaces and open on the other of said obverse and reverse surfaces, said male separators on each of said fill-sheet obverse and reverse surfaces matable with said male separators of an adjacent fill-sheet at a nested position, said adjacent fill-sheets translatable between a nested position and an operational position, said male separators operable to contact the other of said obverse and reverse surfaces of an adjacent fill-sheet to provide an offset gap between said adjacent fill-sheets.

34. A spacing arrangement for heat transfer devices and mass transfer devices having film fill-packs, said fill-packs having at least two adjacent fill-sheets and means for arranging said fill-sheets, each said fill-sheet having a first side edge, a second side edge, a top edge, a bottom edge, a longitudinal axis, and a transverse axis, said arrangement comprising:

each said fill-sheet having an obverse surface and a reverse surface, said adjacent fill-sheets initially provided at a nested position and shiftable between said nested position and an operational position in said heat and mass transfer devices;

means for separating on each said fill-sheet;

said means for separating positioned on one of said obverse and reverse surfaces, said means for separating on adjacent film-sheets matable at said nested position, said separating means operable to define a predetermined offset gap between adjacent fill-sheets at said operational position after an offset shift of said fill-sheets on said means for arranging;

each said fill-sheet having at least one mounting passage impression with a first outline having a first and major axis with a first length, a second outline defined on said first outline and having a central position on said major axis, said first outline having a central position on said major axis displaced from said second outline central position, said first and major axis with a first length extending through said first outline central position and said second outline central position, at least one second and minor axis with a second length shorter than said first length and extending through one of said first outline and second outline central position, one of said first and second mounting-passage outlines defining a first aperture, the other of said first and second mounting-passage outlines defining a second aperture, one of said first and second apertures provided on each said fill-sheet in said fill-pack, at least one of said two adjacent fill-sheets of said fill-pack having one of said first and second apertures and the other of said at least two adjacent fill-sheets having the other of said first and second apertures, said means for arranging extending through said first and second apertures of said adjacent fill-sheets to provide at least one of arranging said fill-sheets in an ordered arrangement and supporting said fill-sheets in said devices.

35. A spacing arrangement for heat transfer device and mass transfer device film fill-packs as claimed in claim 34 wherein said means for arranging is a mounting bar extending through said first and second apertures for supporting said fill-sheets, said first aperture being a circle with a center, said second aperture being a generally elliptical shape with said circle therein, said other of said fill-sheets having said elliptical shape displaceable on said mounting bar to provide said fill-sheets at an ordered arrangement.

36. A spacing arrangement for heat transfer device and mass transfer device film fill-packs as claimed in claim 34 wherein each said mounting passage first outline has a generally elliptical shape having said mounting passage major axis, said ellipse having a first focus at said first outline central position with said first minor axis through said first focus, and a second focus at said second outline central position with said second minor axis vertically displaced downward from said first minor axis, said first and second minor axes about normal to said major axis, said second outline being a circle, said second focus providing a radial center for said second outline, said circle having a radius defined between said radial center and said first outline along said second minor axis, said circle being pierced to provide a second aperture for said means for arranging.

37. A spacing arrangement for heat transfer device and mass transfer device film fill-packs as claimed in claim 36 wherein said first focus and said second focus have a predetermined focus interval along said major axis;

each said fill-sheet having at least one aisle on one of said fill-sheet obverse surface and reverse surface, said aisle extending generally parallel to one of said longitudinal and transverse axes, each said fill-sheet having a plurality of male separators and female separators, each said male separator and female separator positioned on an aisle and extending above one of said obverse and reverse surfaces, said male separators extending vertically above said female separators on said aisle, at least said female separators being hollow and open on the other of said obverse and reverse surface opposite said surface of said aisle, said male separators of said one fill-sheet surface matable and in register with female separators of adjacent fill-sheet other surface at assembly of said fill-pack to maintain a specified separation distance between adjacent obverse and reverse surfaces of adjacent fill-sheets.

38. A spacing arrangement for heat transfer device and mass transfer device film fill-packs as claimed in claim 36 wherein said male separators and said female separators are generally aligned on said aisle with a predetermined registration gap between adjacent male separators and female separators, said registration gap approximately equal to said focus interval to provide each said male separator in register with a hollow of a female separator of an adjacent fill-sheet other surface to maintain said separation gap between said adjacent fill-sheet surfaces at assembly of said fill-pack.

39. A spacing arrangement for heat transfer device and mass transfer device film fill-packs as claimed in claim 36 wherein said fill-pack media has a plurality of said fill-sheets with alternating first and second apertures for said means for arranging, each said fill-sheet having a plurality of rows of ridges and grooves on each said obverse surface and reverse surface, said rows arranged in a formed array of a repeating pattern of said rows, each said row having at least one apex above said fill-sheet surface and at least one valley below said fill-sheet surface, said focus interval providing said adjacent fill-sheets of said alternating aperture fill-sheets to translate a fixed distance, said fixed distance moving said apices on said facing obverse surfaces and reverse surfaces of said adjacent fill-sheets into substantial alignment and proximity with said facing surface apices to define gasflow channels between said adjacent fill-sheet facing obverse and reverse surfaces.

* * * * *